United States Patent
Broer et al.

(10) Patent No.: US 7,123,319 B2
(45) Date of Patent: Oct. 17, 2006

(54) LIQUID CRYSTAL DISPLAY LAMINATE AND METHOD OF MANUFACTURING SUCH COMPRISING A STRATIFIED-PHASE-SEPARATED COMPOSITE

(75) Inventors: Dirk Jan Broer, Eindhoven (NL); Roel Penterman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 188 days.

(21) Appl. No.: 10/203,574

(22) PCT Filed: Dec. 10, 2001

(86) PCT No.: PCT/IB01/02463

§ 371 (c)(1),
(2), (4) Date: Aug. 9, 2002

(87) PCT Pub. No.: WO02/42832

PCT Pub. Date: May 30, 2002

(65) Prior Publication Data

US 2003/0038912 A1    Feb. 27, 2003

(30) Foreign Application Priority Data

Dec. 14, 2000  (EP)  .................................. 00204529
Apr. 17, 2001  (EP)  .................................. 01201395
Oct. 25, 2001  (EP)  .................................. 01204081

(51) Int. Cl.
*G02F 1/1333*  (2006.01)

(52) U.S. Cl. .................... 349/86; 349/93; 349/122; 349/156; 349/158; 349/143

(58) Field of Classification Search ................ 349/122, 349/158, 117, 96, 113, 86, 88, 12, 188, 89, 349/93, 10, 16, 156, 155, 138, 187
See application file for complete search history.

(56) References Cited

U.S. PATENT DOCUMENTS

| 5,188,760 A |   | 2/1993 | Hikmet et al. ........... 252/299.01 |
| 5,289,300 A | * | 2/1994 | Yamazaki et al. ............. 349/42 |
| 5,506,704 A |   | 4/1996 | Broer et al. ................... 359/63 |
| 5,903,330 A |   | 5/1999 | Funfschilling et al. ...... 349/129 |
| 5,948,487 A | * | 9/1999 | Sahouani et al. ............. 428/1.3 |
| 5,949,508 A |   | 9/1999 | Kumar et al. ................ 349/122 |

(Continued)

FOREIGN PATENT DOCUMENTS

EP          1065553 A1        1/2001

(Continued)

OTHER PUBLICATIONS

EP 1065553 A1, Ogawa et al., Jan. 3, 2001.*

(Continued)

*Primary Examiner*—Dung T. Nguyen
*Assistant Examiner*—Thoi V. Duong

(57) ABSTRACT

A liquid crystal display laminate comprises a liquid crystal layer and a single substrate for confining that layer, allowing the liquid crystal layer to be provided using a wet deposition method such as printing or coating. To improve mechanical stability and provide protection and keep the liquid crystal layer in place, a cover layer may be provided on the liquid crystal layer. The cover layer and liquid crystal layer may together form a stratified-phase-separated composite in which case the liquid crystal layer and the cover layer are provided simultaneously. The display laminate is very thin and light weight. The display laminate may include or be combined with further layers such as orientation layers, electrode layers, polarizers and/or retarders layer to form a fully functional, high contrast display device.

14 Claims, 6 Drawing Sheets

U.S. PATENT DOCUMENTS

Figure 1:
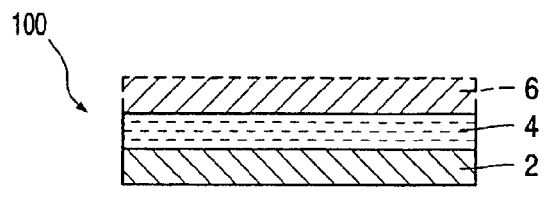

| | | | | |
|---|---|---|---|---|
| 5,956,112 | A | * | 9/1999 | Fujimori et al. ............. 349/156 |
| 6,025,897 | A | | 2/2000 | Weber et al. .................. 349/96 |
| 6,166,790 | A | * | 12/2000 | Kameyama et al. .......... 349/96 |
| 6,177,968 | B1 | * | 1/2001 | Okada et al. ................. 349/38 |
| 6,197,209 | B1 | * | 3/2001 | Shin et al. .................... 216/84 |
| 6,229,586 | B1 | * | 5/2001 | Date et al. .................. 349/113 |
| 6,366,333 | B1 | * | 4/2002 | Yamamoto et al. ......... 349/113 |
| 6,623,811 | B1 | * | 9/2003 | Shibue et al. ................ 428/1.1 |

FOREIGN PATENT DOCUMENTS

| | | |
|---|---|---|
| WO | WO 9947967 | 9/1999 |

OTHER PUBLICATIONS

Korean Liquid Crystal Association (KLCA), 1st International Invited Lecture Notes, Jul. 21, 2000, "LC Devices Fabriacted with Phase Separated Composite structures Method using Flexible and Rigid Substrates," Prof. Satyendra Kumar at Kent State University, pp. 1-16.

Broer et al.: "Photo-Induced Diffusion in Polymerizing chiral Nematic Media," Research News, 1999 pp. 573-578.

Broer et al.: "In-situ photopolymerization of oriented liquid-crystalline acrylates, 3a: Oriented polymer networks from a mesogenic diacrylate," 1989 pp. 2255-2268.

Van De Witte et al.: "Modification of the pitch of chiral nematic liquid crystals by means of photoisomerization of chiral dopants,"Liquid Crystals, 1998, vol. 24, No. 6, pp. 819-827.

Bobrov et al.: "P-24: Incorporated of Optiva Polarizers in LCD Production Line," SID 01 Digest, 2001, pp. 639-641.

Vorflusev et al: "Phase-separated Composite Films For Liquid Crystal Displays" Science, American Association For The Advancement Of Science, US, vol. 5409, No. 283, Mar. 19, 1999, pp. 1903-1905.

\* cited by examiner

LIQUID CRYSTAL DISPLAY LAMINATE AND METHOD OF MANUFACTURING SUCH COMPRISING A STRATIFIED-PHASE-SEPARATED COMPOSITE

The invention relates to a liquid crystal display laminate, a method of manufacturing such a laminate and a display device comprising such a laminate.

Liquid crystal (LC) display devices are electro-optical devices capable of modulating the properties of light incident thereon by subjecting the liquid crystal to an electric field. An LC display device typically comprises a display panel having a plurality of LC pixels, each pixel being individually addressable.

A liquid crystal panel or cell comprises liquid crystal material which, as the liquid crystal material is a liquid, is disposed between a pair substrates, eg made of glass or plastic, to keep the liquid crystal material in position.

Conventionally, such a liquid crystal cell is manufactured by gluing the pair of identical substrates together along their perimeter leaving a small opening, evacuating the container so obtained and then filling the container with the liquid crystal material. For example, the LC cells disclosed in U.S. Pat. No. 5,949,508 are manufactured in this manner.

The conventional method of cell manufacturing is laborious and expensive. For example, it takes a long time, typically hours, to fill the cell as the liquid crystal layer is typically about 5 μm thick and the glass substrates may have a surface area of one square meter. Moreover, the substrates are relatively thin (typically a few hundred μm) which, in combination with the large area makes them very vulnerable and difficult to handle. Additionally, to obtain satisfactory display performance the surface of the substrates needs to be optically smooth. All these and other requirements make the substrates very expensive and the choice of material for the substrate is typically limited to special kinds of glass, or in some cases plastic. On the other hand, the need exists to go to thinner and lighter liquid crystal cells.

The object of the invention is, inter alia, to provide a liquid crystal display laminate and display device comprising such which is cost-effective and which can be manufactured in a manner fundamentally different from the conventional manufacturing process, allowing significant savings in the cost and time of manufacture.

This object is, according to the invention, achieved by a liquid crystal laminate comprising a liquid crystal layer, at a side of the liquid crystal layer, a single substrate for confining the liquid crystal layer and, optionally, a cover layer formed adjacent to the liquid crystal layer for covering the liquid crystal layer at a side opposite the substrate side of the liquid crystal layer.

The substrate for confining the liquid crystal layer has at least the function of providing a surface onto which the liquid crystal layer or the material from which such layer is obtainable may be applied. In accordance with the invention, the substrate of the laminate is the single substrate having this function during manufacture.

It is understood that, in the context of the invention, the term substrate may consist of one layer homogeneous in matter composition or may consist of a stack of layers each of which may or may not be patterned and each of which is homogeneous in matter composition. Further, if a substrate has a layer directly adjacent to it, the combination of substrate and adjacent layer may be referred to as a substrate provided with a layer, or carrying a layer or a similar expression or, equivalently, the combination as a whole may be referred to as a substrate which includes the adjacent layer.

Having a single substrate for confining the liquid crystal layer, allows the laminate to be manufactured in a fundamentally different manner. In particular it allows the liquid crystal layer (and further functional layers, if any) to be provided by means of a coating method, a printing method or other wet deposition method, thus avoiding the laborious and expensive step of filling the cell formed by two spaced, glued-together substrates with liquid crystal material to form the liquid crystal layer as is done conventionally. Generally, since the laminate comprises a single substrate the laminate onto which the liquid crystal layer and, if desired, further layers can be provided successively the laminate can be manufactured in a continuous process, even a roll to roll process, in contrast to the conventional batch process. Continuous processes are very suitable for inexpensive high volume mass manufacture.

Moreover, use of a wet deposition method allows differentiation and separate optimization of the material used to form the liquid crystal layer during manufacture of the liquid crystal layer and the liquid crystal layer material to be used when the laminate is in use. Thus the laminate is easily adaptable to different kinds of substrates, not only glass and plastic but also metal mirror coated or silicon substrates optionally comprising integrated circuits manufactured using CMOS technology. In the context of the invention, the term wet deposition method refers to a printing or a printing method or the like. Suitable coating methods include but are not limited to painting, solvent casting, doctor-blading, wired rod coating, extrusion coating, die-slot coating, spin-coating, dip-coating, spray-coating, roll coating Langmuir-Blodgett, and web-coating. Suitable printing methods include but are not limited to ink-jet printing, silkscreen-printing, flexo-graphic printing, offset printing and the like.

In another aspect, the invention relates to a liquid crystal display laminate consisting of a plurality of layers including a liquid crystal layer and a substrate layer for confining the liquid crystal layer and, optionally, a cover layer adjacent the liquid crystal layer on the liquid crystal layer side opposite the substrate, characterized in that none of the layers of the plurality of layers, excluding the substrate layer, is identical to the substrate layer.

If the none of the layers of which the laminate consists is identical to the substrate layer, that is all layers differ therefrom in shape and/or composition there is effectively only one substrate. Having one and only substrate instead of two as is conventional, a cost-effective laminate is obtained because the substrates form a significant part of the total cost of an LC display device. The cost of the liquid crystal cell is therefore significantly reduced by using, in accordance with the invention, one substrate. Furthermore, the substrates for confining the liquid crystal layer form a significant part of the total thickness of any LC display device. Using only one substrate significantly reduces the thickness and weight of the display device. The laminate in accordance with the invention may be manufactured in a cost-effective method by applying the layers in a continuous bottom-up process as described hereinbelow.

The liquid crystal cell disclosed in U.S. Pat. No. 5,949,508 has two identical substrates instead one and a single cover layer (corresponding to the polymer layer disposed between the glass substrate and the liquid crystal layer). This is also the case in an article in Science vol 283, pp 1903–1905, 1999 authored by the inventors of U.S. Pat. No. 5,949,508 and in the 1$^{st}$ International Invited Lecture Notes presented by one of the inventors at an occasion organized by the Korean Liquid crystal association and the liquid crystal research center of Kon-Kuk University on Jul. 21, 2000 at Kon-Kuk University, Korea. Without providing any further means but the single substrate for preventing the liquid crystal layer material from flowing, the liquid crystal laminate is of limited practical use. Preferably, therefore further means are provided which curb the flow of the liquid crystal layer material in at least directions normal to and away from the single substrate.

In a first embodiment providing such means, the laminate in accordance with the invention has a liquid crystal layer selected such that it has the properties of a solid, with respect to the translational movement of its constituent liquid crystalline molecules and the properties of a liquid with respect to the rotational movement of the liquid crystalline molecules, the latter movement being necessary to attain the LC layer's electro-optical effect. In particular, such a laminate can be obtained by providing an LC layer comprising a gel-forming agent. Such an LC layer is for example described in U.S. Pat. No. 5,188,760.As another example, adding 0.1 wt % of 1,3:2,4 di-O-benzylidene-D-sorbitol dramatically increases the elastic modulus of an LC material allowing pressure to be exerted on it without leading to any flow.

In a second embodiment providing such means, the flow of liquid crystal material is prevented by forming, adjacent the liquid crystal layer, a cover layer on the side of the liquid crystal layer remote from the single substrate for confining the liquid crystal layer. Apart from preventing flow of the liquid crystal molecules the cover layer also improves mechanical integrity and ruggedness and serves as a protective layer.

Advantageously the first and second embodiment are used in combination, as the "solid" liquid crystal layer of the first embodiment makes it easier to provide a cover layer on the liquid crystal layer during manufacture without disturbing the liquid crystal layer. Moreover, since the cover layer is not engaged in the forming of the liquid crystal layer the requirements in terms of smoothness of its surface are less strict, which makes the cover layer significantly less expensive than traditional substrates and allows the cover layer to be different (in terms of composition and/or shape) from the substrate for confining the liquid crystal layer.

A preferred embodiment of the laminate in accordance with the invention is characterized in that the liquid crystal display laminate in accordance with the invention comprises a cover layer formed adjacent to the liquid crystal layer, the liquid crystal layer and the cover layer together forming a stratified-phase-separated composite.

The use of a stratified-phase-separated composite in a single substrate laminate is advantageous in that it allows the liquid crystal layer and cover layer to be formed at the same time. This not only reduces time of manufacture but eliminates the risk that the subsequent application of the cover layer on the liquid crystal layer surface disturbs the geometry of that surface leading to a non-uniform liquid crystal layer and thus poor display properties. The simultaneous formation may actually promote the formation of a uniform liquid crystal layer. If a stratified-phase-separated composite is used, the formation of the liquid crystal layer and in particular the process of obtaining the correct thickness is self-aligned. Thus, there is no need to use spacers to control the thickness of the liquid crystal layer as is conventional in the art. The self-aligned property is even maintained if the single substrate (surface) is curved during manufacture which renders stratified-phase-separated composites particularly suitable for use in curved and flexible displays.

In a broad sense, a stratified-phase-separated composite is a composite comprising a liquid layer and a solid layer, in particular a polymeric layer, which is obtained by the stratification of a stratified-phase-separable material, the stratification being a phase-separation of the stratified-phase-separable material into distinct adjacent layers, the stratification being brought about by subjecting the stratified-phase-separable material to an effective phase-separating stimulus, such as a dose of radiation.

The thickness stratified-phase-separated composite can be anything between 1 and 200 µm, or better 2 to 150 µm, or still better 3 to 100 µm. A preferred range is 5 to 50 µm, or even more preferred 10 to 20 µm. The liquid crystal layer of the stratified-phase-separated composite can have a thickness of 0.5 to 20 µm or preferably 1 to 10 µm.

In order to improve the mechanical integrity and stability of the stratified-phase-separated composite and/or maintain a well-defined liquid crystal layer thickness, the liquid crystal layer comprises and/or is partitioned by connecting members connect the single substrate to the cover layer. Thus the connecting members extend throughout the thickness of the liquid crystal layer. The connecting members may be conventional spacers which are partially embedded in the cover layer, or a relief structure pattern photolithographically provided on the substrate before the stratified-phase-separated composite is formed. In a very advantageous embodiment, the connecting members are formed from pattern-wise photo-polymerized photo-polymerizable stratified-phase-separable coating material.

In a particular embodiment of the laminate in accordance with the invention is characterized in that the liquid crystal layer or a part thereof is disposed between spaced electrodes for setting up an electric field between the spaced electrodes which is capable of switching the liquid crystal layer or the said part thereof, the spaced electrodes being arranged on the substrate side of the liquid crystal layer.

In order to operate the electro-optical effect, the display laminate may be provided with suitably arranged electrodes, also referred to as electrode layers. Having only a single substrate and no cover layer or a cover layer whose surface is not particularly suitable for applying electrodes thereon, which is for example the case if conventional ITO electrodes are provided by sputtering, it is convenient to provide the electrodes on the substrate side of the liquid crystal layer. In the art such an electrode arrangement is referred to as in-plane switching.

The in-plane switching electrode arrangement is known per se.

Another embodiment of the laminate in accordance with the invention is characterized in that the liquid crystal layer or a part thereof is sandwiched between a bottom electrode disposed on the substrate side of the liquid crystal layer and a top electrode disposed on the side of the liquid crystal layer remote from the single substrate for subjecting the liquid crystal layer or the said part thereof to an electric field, the top electrode preferably a wet-deposited electrically conducting material.

The number of LC effects which may be operated with an in-plane switching electrode arrangement is limited and does not include the more common LC effects such as the twisted nematic (TN) and the super twisted nematic (STN) effect. To expand the number of LC effects which are operable using the laminate, in particular to include the more commonly used LC effects or to obtain another embodiment of the in-plane switching arrangement, the liquid crystal layer is sandwiched between spaced electrodes.

In a preferred embodiment the top electrode comprises a wet-deposited material such as an organic electrically conducting material or a silver paste.

The organic electrically conducting material, conducting polymers in particular, have the advantage of being obtainable using a wet deposition method or a lamination method which is compatible with the underlying layers of the display laminate. If the conducting polymer needs to be transparent a poly-ethylenedioxythiophene (PEDOT) or a poly-aniline may be used. Moreover, if the top electrode or a plurality of such electrodes is to be provided in accordance with a pattern, such patterning may be conveniently performed using a printing method or photo-chemical patterning method. A transparent top electrode is useful for transmissive displays, the silver paste may be particularly effective reflective display where the silver top electrode serves as the reflector.

The thickness of the bottom electrode is typically 100 to 200 nm. The thickness of the top electrode is typically 100 to 500 nm.

In an embodiment, the laminate in accordance with the invention is characterized in that the single substrate is, on the liquid crystal layer side, provided with an alignment layer for orienting the liquid crystal layer.

In a preferred embodiment of the laminate in accordance with the invention comprising a cover layer and liquid crystal layer in the form of a stratified-phase-separated composite, an alignment layer for orienting the liquid crystal layer is provided between the liquid crystal layer and the cover layer.

The thickness of the alignment layer may be as small as a molecular monolayer, or typically 20 to 100 nm.

To contrast provided by the electro-optical LC effect of the switchable liquid crystal layer as it appears to the unaided eye, may, depending on the LC effect, may be significantly improved by the use of polarizers. Therefore, a preferred embodiment of the display laminate in accordance with the invention, comprises or is combined with one or more polarizing layers.

Preferably, the polarizer layer is obtainable using a wet deposition method.

The thickness of such a wet deposited polarizer layer is typically 200 nm to 2 µm.

Depending on the type of LC effect, the optical performance of the electro-optical effect, such as contrast or viewing angle dependence may be further improved by means of a retardation layers. Therefore, a preferred embodiment of the laminate in accordance with the invention comprises or is combined with one or more retardation layers.

Preferably, the reatardation layer is obtainable using a wet deposition method. The thickness of such a wet deposited retardation layer is typically 50 to 500 nm.

To render the laminate in accordance with the invention suitable for application in a reflective display, an embodiment of the laminate in accordance with the invention comprises or is combined with a reflector layer.

The invention also relates to a liquid crystal display laminate comprising a substrate, a liquid crystal layer, electrodes for subjecting the liquid crystal layer or a part thereof to an electric field, a cover layer and, optionally, an alignment layer, one or more polarizer layers and/or a retardation layer, the liquid crystal layer and the cover layer having a combined thickness in the range 2 µm to 100 µm, or, more particular, 5 to 50 µm, the one or more polarizing layers having or each having a thickness in the range of 0.1 to 100 µm or, more particular, 0.1 to 10 µm, the retardation layer having a thickness in the range of 0.05 to 100 µm or, more particular, 0.05 to 10 µm, and the display laminate having a thickness less than 1 mm, or, more particular, less than 0.5 mm.

In particular, by making consistent use of wet deposition methods to manufacture a LC display laminate for use in a display device, a display laminate a very thin LC display can be obtained in a very cost effective manner.

Conventional LC display laminates, in the art normally referred to as LC cells have a minimum thickness of about 1.5 mm. The laminate in accordance with the invention has a thickness which is significantly less. However if the laminate is made too thin, for example a thickness less than the minimum thickness specified above, the laminate becomes fragile is easily damaged.

A preferred embodiment of the invention relates to a display device comprising a display laminate in accordance with the invention.

The laminate in accordance with the invention may be used in any kind of display device such as a reflective, a transmissive, or a transflective display. Monochrome or full-color displays can be realized. Passive and active matrix displays can be provided with the laminate in accordance with the invention.

The invention also relates to a method of manufacturing a liquid crystal display laminate. In accordance with the invention, the method comprises:

providing a substrate for confining a liquid crystal layer at a side thereof;

providing a liquid crystal coating material from which the liquid crystal layer is obtainable;

depositing the liquid crystal coating material on the substrate by means of a wet deposition method;

obtaining, adjacent to the substrate, the liquid crystal layer from the liquid crystal coating material, the substrate thus confining the liquid crystal layer at a side thereof;

optionally, providing a cover layer for covering the liquid crystal layer at a side opposite the side at which the substrate confines the liquid crystal layer.

The method in accordance with the invention differs from the conventional method of forming a LC cell. Conventionally, the liquid crystal layer is formed by providing a cell of two glued-together substrates, the substrates being kept at a uniform predetermined distances by means of spacers, which cell is then filled with liquid crystal material to form the liquid crystal layer. In the method in accordance with the invention, at the time the liquid crystal layer is provided only a single substrate is present. Having only a single substrate in place allows a wet-deposition method to be used for the provision of the liquid crystal layer. Wet deposition methods such as printing and coating methods allow thin films of controlled thickness to be manufactured cost-effectively on a large scale, in particular they are suitable for a continuous process, in particular a roll-to-roll process.

In a preferred embodiment of the method in accordance with the invention, the liquid crystal coating material is a stratified-phase-separable coating material; and the steps of obtaining the liquid crystal layer and providing the cover layer are executed simultaneously by carrying out stratification of the stratified-phase-separable material to form the liquid crystal layer and the cover layer covering the liquid crystal layer.

The preferred method provides the advantages of having a cover layer and while providing a simple effective method of providing such layer. The stratification process is a self-aligned process with respect to the thickness and uniformity of thickness of the liquid crystal layer. The self-aligning property is maintained if a non-planar substrate is used which renders the method in accordance with the invention very suitable for flexible and bent substrate LCDs. The stratified-phase-separated composite that is obtained from the stratified-phase-separable material has a liquid crystal layer and solid cover layer which mechanically protects and prevents flow of the liquid crystal layer. Preferably, the solid layer is a polymeric layer. The cover layer of the stratified-phase-separated composite has a mechanical strength sufficient to replace the substrate conventionally used in LC cells. It also capable of serving as a substrate for the provision of further layers.

In a preferred embodiment of manufacturing the laminate in accordance with the invention, the stratified-phase-separated composite is manufactured by means of photo-polymer-induced phase-separation. An example of an liquid crystal layer manufactured using photo-polymer-induced phase-separation is described in U.S. Pat. No. 5,949,508.

A preferred of the method in accordance with the invention comprises the step of applying one or more polarizing or retardation layers using a wet deposition method.

Another preferred of the method in accordance with the invention comprises the step of applying, on the cover layer, one or more electrodes by a wet deposition method. These and other aspects of the invention will be apparent from and elucidated with reference to the embodiments described hereinafter.

IN THE DRAWINGS

Figure 1A:
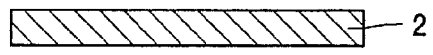
Figure 1B:
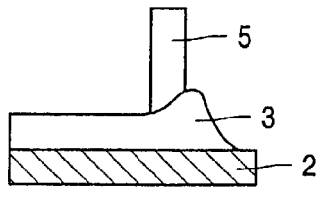
Figure 1C:
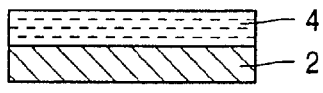
Figure 1D:
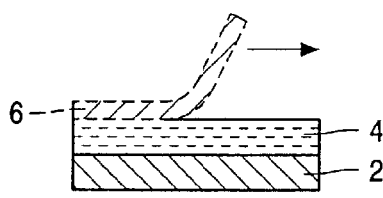
Figure 2A:
Figure 2B:
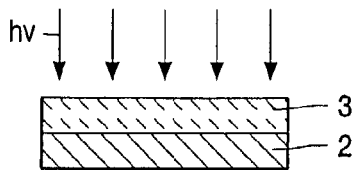
Figure 2C:
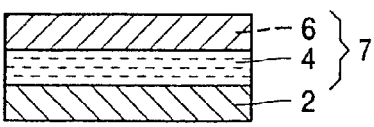
Figure 3:
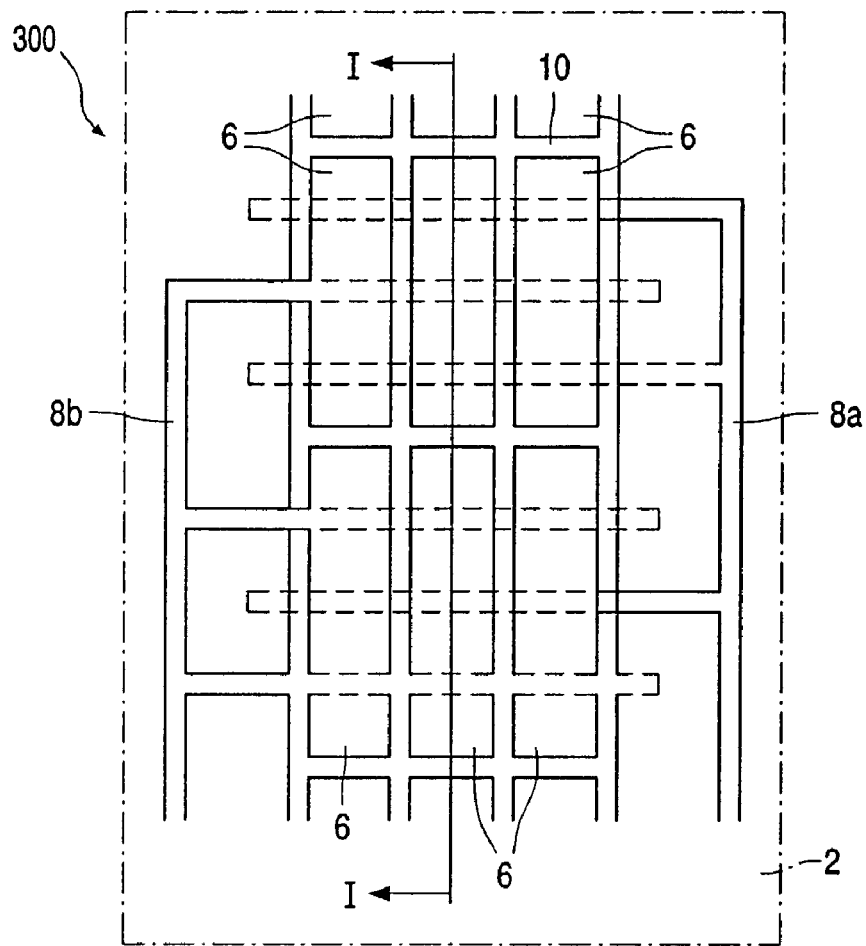
Figure 4:
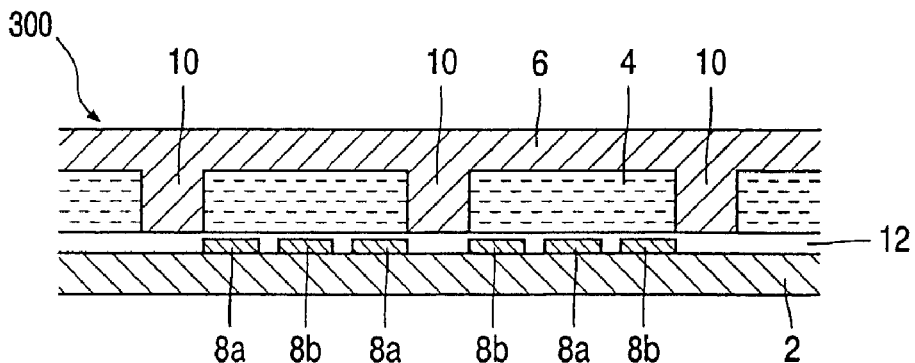
Figure 5:
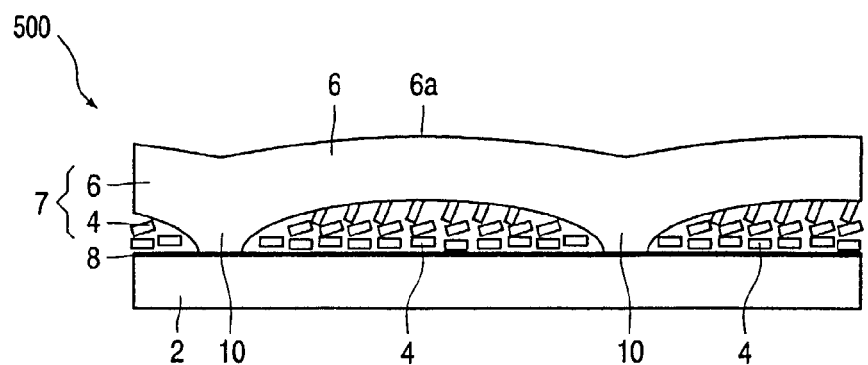
Figure 5A:
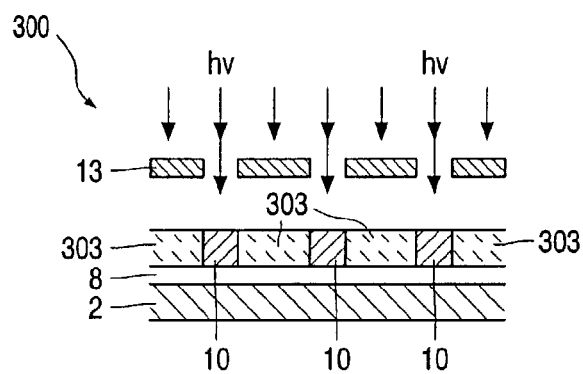
Figure 5B:
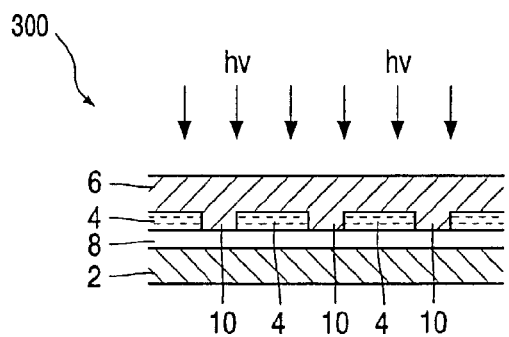
Figure 6:
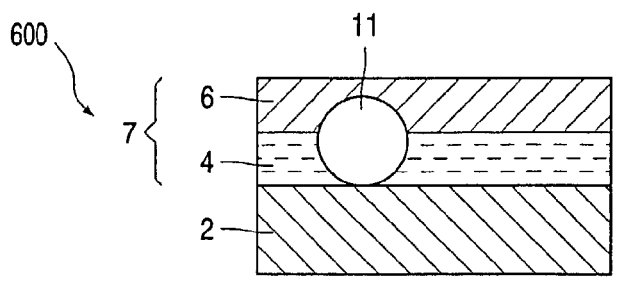
Figure 7A:
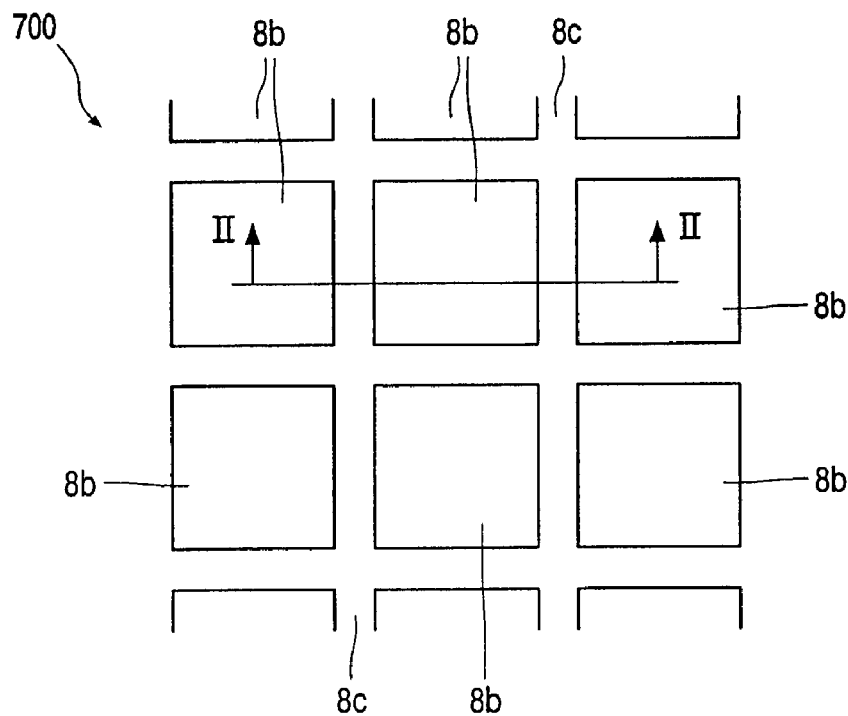
Figure 7B:
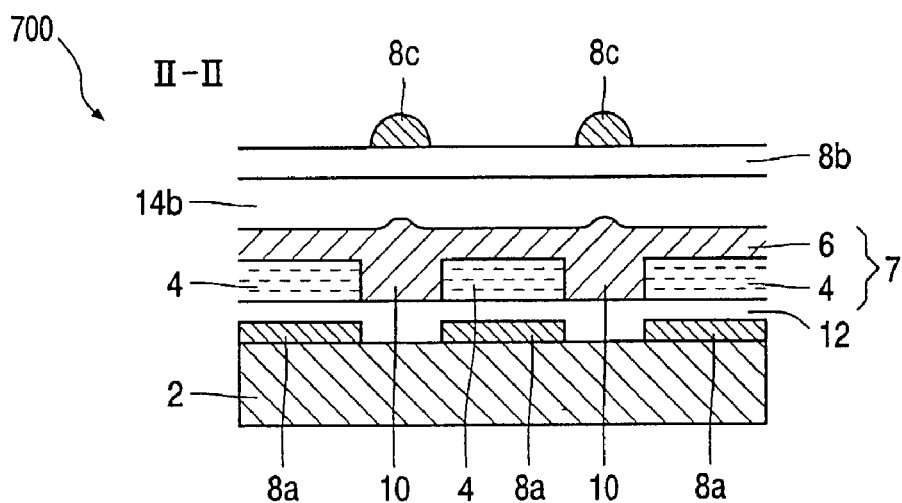
Figure 8:
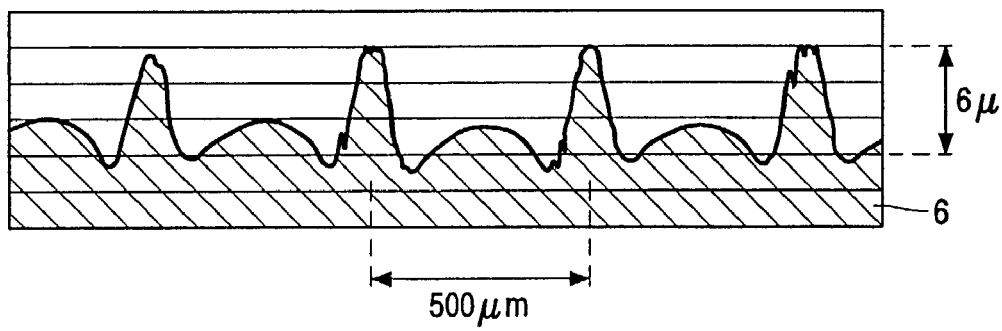
Figure 9:
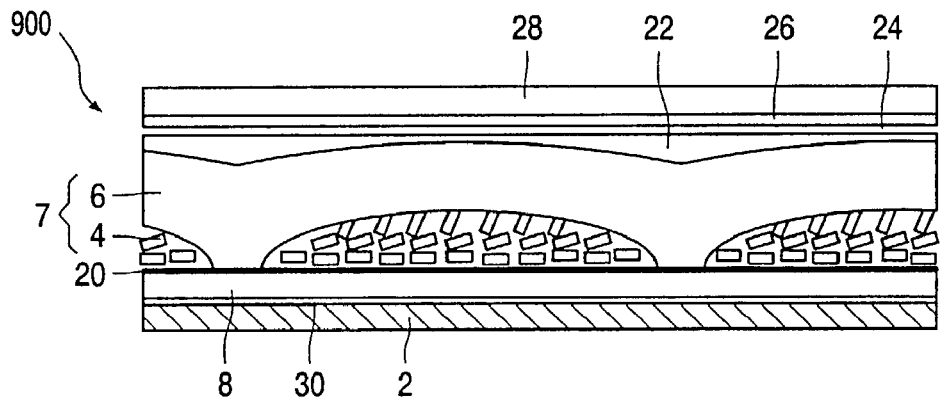
Figure 10:
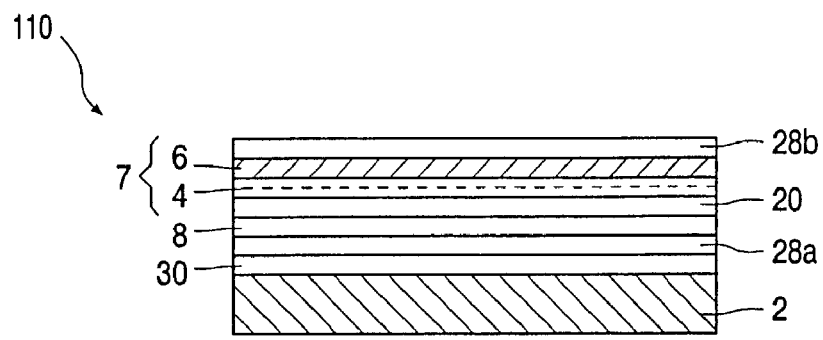
Figure 11:
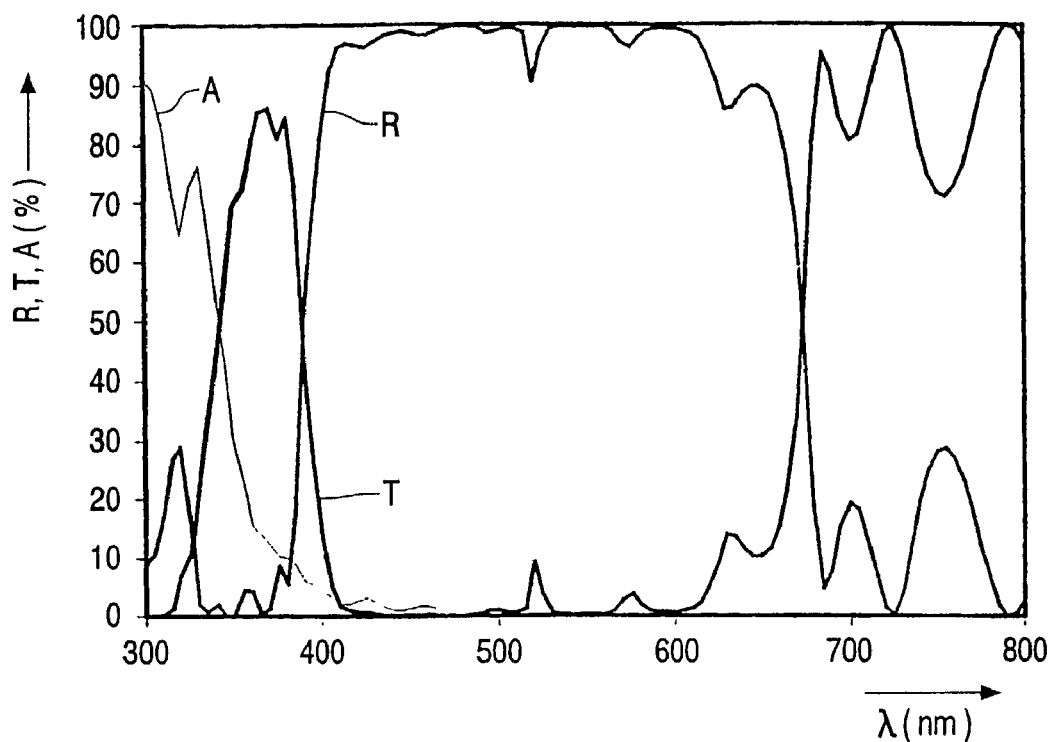
Figure 12:
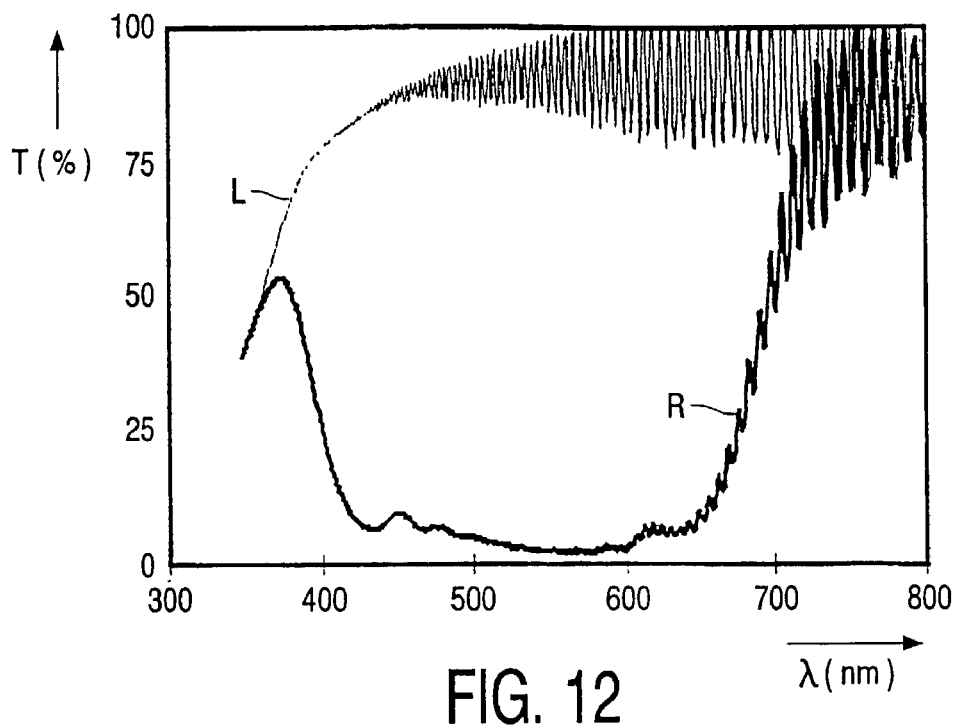

FIG. 1 shows, schematically, a cross-sectional of an embodiment of a display laminate in accordance with the invention, FIGS. 1A–1D show, schematically, various stages in the manufacture of the laminate shown in FIG. 1 using an embodiment of the method in accordance with the invention, FIGS. 2A–2C show, schematically, stages of an embodiment of a method of manufacturing in accordance with the invention, FIG. 3 shows, schematically, a plan view of an embodiment of a display laminate in accordance with the invention comprising an in-plane switching electrode arrangement, FIG. 4 shows, schematically, a cross-sectional view along the line I—I of FIG. 3, FIG. 5 shows, schematically, in cross-section, another embodiment of a display laminate in accordance with the invention, FIGS. 5A and 5B show, schematically, stages in the manufacture of a display laminate in accordance with the invention using a method in accordance with the invention, FIG. 6 shows, schematically, in cross-section, a further embodiment of a display laminate in accordance with the invention, FIG. 7A shows, schematically, a plan view of an embodiment of a display laminate in accordance with the invention having a sandwich electrode arrangement, FIG. 7B shows, schematically, a cross-sectional view along the line II—II of FIG. 7A, FIG. 8 shows, a measured cross-sectional profile of an interface of an embodiment of a laminate in accordance with the invention, FIG. 9 shows, schematically in a cross-sectional view, an embodiment of a one-polarizer reflective display comprising a display laminate in accordance with the invention comprising further functional layers, and FIG. 10 shows, schematically in a cross-sectional view, an embodiment of a two-polarizer display device comprising a display laminate in accordance with the invention comprising further functional layers, FIG. 11 shows a graph of relative transmission (curve T), reflection (curve R) and absorption (curve A), in %, as a function of wavelength $\lambda$, in nm, of a reflector layer for use in combination with a laminate in accordance with the invention, and FIG. 12 shows a graph of transmission for left-handed (curve L) and right-handed (R) circularly polarized light as a function of wavelength $\lambda$, in nm, of a reflector layer for use in combination with a laminate in accordance with the invention.

In a broad sense, the invention relates to a liquid crystal display laminate comprising a liquid crystal layer, at a side of the liquid crystal layer, a single substrate for confining the liquid crystal layer and, optionally, a cover layer formed adjacent to the liquid crystal layer for covering the liquid crystal layer at a side opposite the substrate side of the liquid crystal layer.

FIG. 1 shows, schematically, a cross-sectional of an embodiment of a display laminate in accordance with the invention.

The liquid crystal display laminate 100 comprises a single substrate 2, a liquid crystal layer 4, and, optionally, a cover layer 6. The single substrate 2 confines the LC layer 4 and, being a substrate, it has, inter alia, during manufacture the function of providing a surface onto which the liquid crystal layer or a material from which the liquid crystal layer is obtainable can be applied. The optional cover layer 6 is formed adjacent the liquid crystal layer 4 on the side opposite of the single substrate 2 and covers the liquid crystal layer 4.

The substrate 2 is a single substrate because, as further detailed hereinbelow, at the time the liquid crystal layer 4 is applied it is the only means to confine the liquid crystal layer 4 which is provided before the application of the liquid crystal layer, the cover layer 6 (if present) being provided after or simultaneous with the liquid crystal layer 4 does not have the function of providing a surface onto which the liquid crystal layer or a material from which the liquid crystal layer is obtainable can be applied.

The substrate layer 2 being a single substrate, none of the layers but the substrate layer 2 of which the laminate 100 consists is identical to the substrate layer 2 in terms of shape and composition. So there is effectively one substrate. Having one and only one substrate instead of two as is conventional, a cost-effective laminate is obtained because the substrates form a significant part of the total cost of an LC display device. The cost of the liquid crystal cell is therefore significantly reduced by using, in accordance with the invention, one substrate. Furthermore, the substrates for confining the liquid crystal layer form a significant part of the total thickness of any LC display device. Using only one substrate significantly reduces the thickness and weight of the display device.

Single Substrate

Since the liquid crystal layer 4 of the laminate 100 may be manufactured using a wet deposition method, differentiation and separate optimization of the material used to form the liquid crystal layer during manufacture of the liquid crystal layer and the liquid crystal layer material to be used when the laminate is in use is possible. Thus the laminate is easily adaptable to different kinds of substrates, not only glass and plastic but also metal mirror coated or silicon substrates optionally comprising integrated circuits manufactured using CMOS technology. If the laminate is used for a transmissive display the single substrate is to be transparent.

The display laminate is particularly useful for flexible displays in which case the single substrate is selected to be flexible or even foldable. For roll to roll manufacturing of the laminate a roll-upable single substrate may be used. Suitable materials for flexible, foldable and/or roll-upable single substrates include polymer films and sheets, metal foils and coated paper or laminates thereof.

Liquid Crystal Layer

The liquid crystal layer 4 or a part thereof is electro-optically active in that it can be switched between different states, a field-on and a field-off state, by subjecting the liquid crystal layer to an electric field. At least one but possibly both of the states the liquid crystal layer molecules are anisotropically oriented to form an anisotropically oriented state. The anisotropically oriented state is optically anisotropic, in particular the state has directionally dependent refractive indices as a result of which light incident on the liquid crystal layer is modulated polarization selectively.

The liquid crystal layer may or may not be partitioned in accordance with a (predetermined) pattern into distinct regions, wherein the electro-optical effect of each region can be operated independently of another region.

By a suitable choice of liquid crystal material and alignment means various known types of anisotropically oriented states are available, such as a planar, a homeotropic, a twisted or splay orientation. The orientation can also be uniaxial or biaxial. Any LC phase may be suitably used, such as nematic, twisted nematic, cholesteric, discotic, smectic A and C, ferroelectric, flexoelectric and the like. The liquid crystal layer may be partitioned into a number of distinct domains, each domain having a different anisotropic orientation. In particular, the difference in orientation may be limited to a difference in the orientation of the director(s) while the type of anisotropy is the same.

The thickness of the liquid crystal layer generally depends on the LC effect and material to be used, but typically is in the range of 1 to 10 μm.

The liquid crystal layer may be made of any kind of liquid crystal material, the selection in principle not being limited with respect to the presence of a single substrate. Those skilled in the art will appreciate that the specific composition of the liquid crystal material to be used depends inter alia on the type of anisotropically oriented state and LC effect sought.

Preferably, the liquid crystal layer 4 comprises means which curb the flow of the liquid crystal layer material in at least directions normal to and away from the single substrate. In an embodiment comprising such means, the laminate in accordance with the invention has a liquid crystal layer selected such that it has the properties of a solid, with respect to the translational movement of its constituent liquid crystalline molecules and the properties of a liquid with respect to the rotational movement of the liquid crystalline molecules, the latter movement being necessary to attain the LC layer's electro-optical effect. In particular, such a laminate can be obtained by providing an LC layer comprising a gel-forming agent. Such an LC layer is for example described in U.S. Pat. No. 5,188,760. As another example, adding 0.1 wt % of 1,3:2,4 di-O-benzylidene-D-sorbitol dramatically increases the elastic modulus of an LC material allowing pressure to be exerted on it without leading to any flow.

LC Effects

Although not all LC effects are equally suitable in all respects, the display laminate may suitably use any conventional LC effect. Preferred are those LC effects in which the liquid crystal layer is a one-phase layer.

The display laminate may operate in accordance with an LC effect which requires polarizers to make the electro-optical effect or which is does not require polarizers for this purpose.

LC effects which require polarizers include well-known effect as electrically controlled birefringence (ECB), twisted nematic (TN), supertwisted nematic (STN), optically compensated birefringence (OCB), vertically aligned nematic (VAN) and ferroelectric liquid crystal (FLC) effects.

In the ECB effect which is known as such, a nematic liquid crystal layer, uniaxially and planar oriented along an LC axis, is disposed between a linear polarizer transmitting light polarized light along a polar axis and a polarized light emitting polarized light along a source axis. If the polar axis and the source axis are crossed and the LC axis is at 45° with these axes, polarized light emitted by the source is transmitted by the LC layer and the polar and reaches the viewer. The transmission in the field-off state depends on the thickness of the cell d, the birefringence of the liquid crystal $\Delta n$ and the wavelength $\lambda$ and is at a maximum when the condition $d\Delta n/\lambda = k/2$ with $k=1, 3, 5, 7, \ldots$ is satisfied.

If the condition above is satisfied, the polarized light transmitted by the LC layer remains linearly polarized but the polarization axis of the light is rotated over 90°. In a preferred cell configuration k is 1, which optimized for a wavelength of 510 nm (green) and a commercial LC material Licrilite ML1001 (Merck Ltd.) with a $\Delta n=0.122$ at the same wavelength, means that the optimum cell thickness is 2.1 μm.

If an electrical field is applied normal to the liquid crystal layer, the liquid crystal molecules orient towards the normal and in doing so the effective $\Delta n$ becomes smaller and the transmitted light becomes elliptically polarized. At suitable electric fields, the polarizer film absorbs only part of the light, an effect that may be applied to generate gray tones. In the fully addressed field-on state, where all LC molecules are aligned along and thus normal to liquid crystal layer, $d\Delta n/\lambda$ becomes 0 and the light is fully extinguished by the polarizer (black state).

In another configuration of the ECB effect, the polarizer directions of the polarizers are arranged parallel to each other to obtain a dark field-off state and a bright and colored field-on state. In again another configuration the LC molecules have a negative dielectric anisotropy and are aligned perpendicular to the electrode surface by a surfactant type of alignment layer (e.g. lecithin). In the field-off state the LC film has a low birefringence for the passing light and a dark state is formed in case of crossed axes of the photoluminescence and the polarizer film, respectively. When the field is switched on, the LC film becomes birefringent above the transition voltage, and the polar transmits the light emitted by the photoluminescence layer.

The TN effect, which is known as such, is preferred if the laminate is for use in multi-color display, containing pixels for emitting red, green or blue light because of its high contrast and its light transmission being relative wavelength independence. This enables effective switching of the three colors with one uniform cell thickness. In a preferred embodiment of the TN effect, on the average for the wavelengths of interest, $d\Delta n/l$ is selected close to $(\frac{1}{2})\sqrt{3}$. By way of example, if the liquid crystal layer is made of a commercial LC material Licrilite ML1001 (Merck Ltd.) with a $\Delta n=0.122$ at a wavelength of 510 nm (green), the optimum cell thickness is 3.6 µm. This means that the cell is perfectly black in the field-off state for 510 nm light and that it has a normalized emission of 0.08 for 440 nm light (blue) and of 0.06 for 620 nm light (red). Both values are sufficiently low to give the display a black appearance for all three colors.

If the axis of the polarizer and the linear polarized light source are arranged at right angles an open state, i.e. an emissive colored state for each pixel and a white state for the integrated performance of a collection of neighboring pixels, is achieved in the field-on state and a black appearance in the field-off state.

In the STN LC effect, the amount of twist of LC is larger than in the TN effect, for instance 180° to 240°. The STN effect is of particular importance in case of array addressing (multiplexing) of the pixel elements based on column and row electrodes on the top and the bottom glass substrate, respectively. The steeper response of the LC molecules on the electrical field enables local switching of pixel elements without ghost effects at neighboring pixels. In general, the light transmission through an STN display is very wavelength dependent. In general, black and white switching or switching of all three principle colors can only be obtained if the liquid crystal layer is used in combination with a set of retardation films (made of for instance of two stretched polycarbonate films) or a retardation film with a complex molecular structure (LC polymer film) compensating for the switching wavelength dispersion of the STN effect. If however the STN effect is used for a monochrome display, the display design can become more simple and cheaper as the optical retardation only needs to be optimized for that single wavelength.

In the OCB effect the LC molecules are aligned in the so-called bent orientation. In the bent orientation, LC molecules are mutually parallel planarly oriented near both surfaces of the LC layer, and vertically oriented in a surface intermediate these surfaces, the orientation changing gradually in thereinbetween. As is know in the art, the bent mode is obtained by properly combining a suitable orientation layer, suitable pretilt, pretilt direction and liquid crystal. Switching of the liquid crystal proceeds faster than in the case of TN and STN.

In the vertically aligned nematic effect, the LC molecules are aligned homeotropically in the field-off state. Accordingly, when arranged between crossed polarizers, no light is transmitted. In the field-on state, because the liquid crystal material is selected to have a negative anisotropy of the dielectric constant, a more or less planar alignment is achieved in the bulk of the liquid crystal layer, whereas the liquid crystal molecules near the surfaces of the liquid crystal layer remain vertically aligned, with the result that the polarization of linear polarized light incident on the liquid crystal layer is twisted by 90° and transmitted by the analyzing polarizer.

Instead of a nematic LC effect also a ferroelectric LC effect can be used. As the operation principle is of this effect is based on the in-plane switching of LC molecules, but now in the ferroelectric smectic-C* (or anti-ferroelectric) mode.

LC effects which are polarizer-free include LC effects based switching between a transparent and a light scattering state, such as polymer dispersed LC (PDLC), LC gels, polymer filled nematics ans $SiO_2$-filled nematics.

Another polarizer-free LC effect is based on a guest-host effect such as an anisotropically oriented mixture of an LC material and one or more dichroic dyes. A dichroic dye has mutually perpendicular axes of low and high absorption. If the said mixture has a net positive dielectric anisotropy, in the field-on state, the dichroic dyes are oriented with a high-absorption axis or axes parallel to the normal of the liquid crystal layer and the liquid crystal layer absorbs a small amount of light only and appears transparent. In the field-off state, an high-absorption axis is oriented parallel to the liquid crystal layer surfaces and the liquid crystal layer has a large absorption and appears dark. To render the effect polarization insensitive twisted liquid crystal layer arrangements may be used. If the liquid crystal layer has a net negative dielectric anisotropy, the effect is reversed with respect to the field-on and field-off state. Combinations of a LC/dichroic dye mixture LC layer and a polarizer can also be used.

A combination of the guest-host effect and scattering effect hereinabove improves the contrast of the laminate.

Another LC effect which can be suitably used in the laminate in accordance with the invention is the cholesteric texture LC effect, wherein the liquid crystal layer is a cholesteric layer capable of wavelength-selectively reflecting light in the filed-off state, if a voltage pulse is applied the focal-conical state is obtained which state is transparent. By applying a further second voltage pulse, higher than the first, the cholesteric state is obtained via an intermediate homeotropic state. By varying the pitch of the cholesteric phase different reflection colors can be obtained.

Cover Layer

The laminate 100 may comprise a cover layer 6. The cover layer, which is formed adjacent the liquid crystal layer on the side of the liquid crystal layer remote from the single substrate for confining the liquid crystal layer, prevents the flow of liquid crystal material in directions opposite the substrate. Apart from preventing flow of the liquid crystal molecules the cover layer also improves mechanical integrity and ruggedness and serves as a protective layer. It also may serve as a substrate for providing layers of the laminate.

Advantageously the cover layer 6 is combined with a liquid crystal layer comprising means to prevent the flow of the liquid crystal layer as described hereinabove as it makes it easier to provide a cover layer on such a liquid crystal layer during manufacture without disturbing the liquid crystal layer. Moreover, since the cover layer is not engaged in the forming of the liquid crystal layer the requirements in terms of smoothness of its surface are less strict, which makes the cover layer significantly less expensive than traditional substrates and allows the cover layer to be different (in terms of composition and/or shape) from the substrate for confining the liquid crystal layer. The cover layer may be a single layer or may be a laminate of different layers. The cover layer or layers may be inorganic or organic and may be selected rigid, flexible or roll-upable. Preferably, the cover layer is an inorganic or organic polymeric layer or a laminate comprising one or more polymeric layers. Although any convenient application method can be used coating printing or lamination methods which are compatible with roll to roll processing are preferred.

Method of Manufacture

The invention also relates to a method of manufacturing a liquid crystal display laminate. In accordance with the invention, the method comprises:

providing a substrate for confining a liquid crystal layer at a side thereof;

providing a liquid crystal coating material from which the liquid crystal layer is obtainable;

depositing the liquid crystal coating material on the substrate by means of a wet deposition method;

obtaining, adjacent to the substrate, the liquid crystal layer from the liquid crystal coating material, the substrate thus confining the liquid crystal layer at a side thereof;

optionally, providing a cover layer for covering the liquid crystal layer at a side opposite the side at which the substrate confines the liquid crystal layer.

The method in accordance with the invention differs from the conventional method of forming a LC cell. Conventionally, the liquid crystal layer is formed by providing a cell of two glued-together substrates, the substrates being kept at a uniform predetermined distances by means of spacers, which cell is then filled with liquid crystal material to form the liquid crystal layer. In the method in accordance with the invention, at the time the liquid crystal layer is provided only a single substrate is present. Having only a single substrate in place allows a wet-deposition method to be used for the provision of the liquid crystal layer. Wet deposition methods such as printing and coating methods allow thin films of controlled thickness to be manufactured cost-effectively on a large scale, in particular they are suitable for a continuous process, in particular a roll-to-roll process.

FIGS. 1A–1D show, schematically, various stages in the manufacture of the laminate shown in FIG. 1 using an embodiment of the method in accordance with the invention.

In a first step the substrate 2 is provided obtaining the stage shown in FIG. 1A. The substrate 2 provides a surface on which a liquid crystal coating material may be provided. The substrate 2 is then coated with a layer of liquid crystal coating material 3 by means of knife coating using a knife 5 as shown in FIG. 1B.

Other wet-deposition methods which can be used to provide the layer 3 include a coating method or a printing method.

In a simple embodiment of the method, the liquid crystal layer 3 and the liquid crystal layer 4 are identical in composition and the step of obtaining the liquid crystal layer from the liquid crystal coating material is performed at the same time as the deposition of the liquid crystal coating material.

However, the requirements of deposition and of use of the liquid crystal layer are generally not identical and thus it is preferable that the layer 3 of liquid crystal coating material is not identical in composition to the liquid crystal layer 4. If this is the case the step of obtaining the liquid crystal layer from the layer 3 is a step separate from the wet deposition step. FIG. 1C shows the stage after the layer 3 of liquid crystal coating material is converted into the liquid crystal layer 4.

Generally, to optimize the deposition process and the properties of the liquid crystal layer during use of the laminate, a need may exist to obtain a difference in viscosity between liquid crystal coating material and the liquid crystal material of the layer 4 in order to increase the ability to flow during manufacture and/or to lower it during use. Generally, a highly viscous liquid crystal layer is required if the flow of the liquid crystal layer is to be prevented.

Various methods are available to increase a desired difference in viscosity during manufacturing and use of the laminate. For example, flow during deposition may be increased by eg diluting the coating material with a solvent and/or increasing the temperature at which deposition is performed. When obtaining the liquid crystal layer from the coating material, the viscosity of the liquid crystal layer is increased by evaporating the solvent and/or lowering the temperature. Another method of increasing the difference in viscosity between the coating material from which the liquid crystal layer is to be obtained by wet-deposition and the liquid crystal layer is to use a gel-forming agent or other agent which when obtaining the liquid crystal layer renders the liquid crystal layer more solid while not impairing the electro-optical effect. A very attractive method to achieve a difference in viscosity is to add monomers having polymerizable groups to the liquid crystal coating material. If the monomers are polymerized if the liquid crystal layer is formed a large difference is viscosity is obtained. An example of such a liquid crystal layer is the liquid crystal gel described in U.S. Pat. No. 5,188,760.

In its simplest form the manufacture of the laminate is finished at the stage shown FIG. 1C.

Optionally, the laminate may be provided with a cover layer 6. In FIG. 1D this is done by laminating the cover layer onto the liquid crystal layer 4. Instead of laminating the cover layer 6 may also be provided using a wet deposition method. The cover layer may also be provided onto the layer 3, that is before the liquid crystal layer 4 is obtained therefrom.

Increasing the viscosity of the liquid crystal layer may reduce the ability to flow but may also have the undesirable effect of reducing the response time of the liquid crystal layer to electric fields. This disadvantage need not occur when a cover layer is used to prevent the liquid crystal layer from flowing during use of the laminate. However, it is in general difficult to apply a cover layer onto a liquid crystal layer on a large scale in a continuous manner. There is a serious possibility that the liquid crystal layer surface which needs to be very uniform to obtain satisfactory display performance is disrupted by the provision of the cover layer. In order to reduce the risk of such disruption the measures proposed to increase the difference between in viscosity are of particular benefit if used in combination with the cover layer 6.

Stratified-phase-separated Composite

A preferred embodiment of the display laminate in accordance with the invention is characterized in that the laminate comprises a cover layer formed adjacent to the liquid crystal layer, the liquid crystal layer and the cover layer together forming a stratified-phase-separated composite.

The use of a stratified-phase-separated composite in a single substrate laminate is advantageous in that it allows the liquid crystal layer and cover layer to be formed at the same time. This not only reduces time of manufacture but eliminates the risk that the subsequent application of the cover layer on the liquid crystal layer surface disturbs the geometry of that surface leading to a non-uniform liquid crystal layer and thus poor display properties. The simultaneous formation may actually promote the formation of a uniform liquid crystal layer. If a stratified-phase-separated composite is used, the formation of the liquid crystal layer and in particular the process of obtaining the correct thickness is self-aligned. Thus, there is no need to use spacers to control the thickness of the liquid crystal layer as is conventional in the art. The self-aligned property is even maintained if the single substrate (surface) is curved during manufacture which renders stratified-phase-separated composites particularly suitable for use in curved and flexible displays.

Stratified-phase-separated composites are known as such from U.S. Pat. No. 5,949,508. In a broad sense, a stratified-phase-separated is a composite comprising a liquid layer and a solid layer, in particular a polymeric layer, which is obtained by the stratification of a stratified-phase-separable material, the stratification being a phase-separation of the stratified-phase-separable material into distinct adjacent layers, the stratification being brought about by subjecting the stratified-phase-separable material to an effective phase-separating stimulus, such as a dose of radiation.

The polymeric layer of the stratified-phase-separated composite may be an organic polymeric layer, such as a polymeric layer obtained from a (meth)acrylate, an epoxide, or a vinylether monomer or a thiol-ene polymer.

The solid (polymeric) layer may also be an inorganic layer of the sol gel type, that is one obtainable from hydrolytically condensing a suitable organometallic compound such as an organosilane, organotitanium, organoaluminium or organozirconium compound, and in particular alkoxides comprising such metals, to form an inorganic, possibly cross-linked, polymer. Hybrid organic/inorganic polymers obtained from the said organometallic compounds functionalized with an organic polymerizable group such as an epoxy, a vinyl, a vinylether or a (meth)acrylate group may be used. A thiol-ene system may also be used.

Stratification Method

In a preferred embodiment of the method in accordance with the invention, the liquid crystal coating material is a stratified-phase-separable coating material; and the steps of obtaining the liquid crystal layer and providing the cover layer are executed simultaneously by carrying out stratification of the stratified-phase-separable material to form the liquid crystal layer and the cover layer covering the liquid crystal layer.

FIGS. 2A–2C show, schematically, stages of an embodiment of a method of manufacturing in accordance with the invention.

FIG. 2A shows a substrate 2 which is, as shown in FIG. 2B, provided with a layer of stratified-phase-separable material 3. The layer 3 is provided by means of a wet deposition method. The stratified-phase-separable material is capable of phase-separating into distinct adjacent layers in response to an effective phase-separating stimulus. Various types can be used. A preferred type of stratification is polymerization-induced phase separation, in particular photo-polymerization-induced phase-separation which is schematically shown in FIG. 2B. The layer of stratified-phase-separable material 3 comprises photo-polymerizable monomers and the material is light absorbing with respect to actinic radiation of energy hv. Upon irradiating the layer of photo-polymerizable stratified-phase-separable material 3 with actinic radiation hv, a light intensity gradient is set up within the layer 3 which in turn leads to gradient in polymerization rate, the rate being higher the further away from the substrate 2. The gradient in polymerization rate brings about the stratification into a solid polymeric layer 6 and a liquid crystal layer 4 thus completing the display laminate.

Other types of stratification processes may also be used. In a first of such other type, the stratified-phase-separable material is dynamically stabilized in that only by actively stirring the stratified-phase-separable material is prevented from phase-separating. Once provided as a coating on a substrate and left to its own devices, stratification will occur spontaneously. This works most conveniently when the dynamic mixture stratifies into two liquid layers. The top liquid layer may then be solidified for example by polymerizing a polymerizable liquid top layer. In a second type, the stratified-phase-separable material is metastable in that only a (small) activation energy is required to induce phase-separation. Once the activation barrier is taken phase-separation proceeds automatically. Such dynamically stabilized and metastable stratified-phase-separable materials can be obtained by surface tension effects. In a third type, the stratified-phase-separable material is thermodynamically stable and can only be made to phase-separate by constantly supplying a phase-separation stimulus throughout the phase-separation process. The polymerization-induced phase separation is an example of this type. Other examples are thermally-induced phase-separation and solvent-induced phase-separation.

In-plane Switching

A particular embodiment of the laminate in accordance with the invention is characterized in that the liquid crystal layer or a part thereof is disposed between spaced electrodes for setting up an electric field between the spaced electrodes which is capable of switching the liquid crystal layer or the said part thereof, the spaced electrodes being arranged on the substrate side of the liquid crystal layer.

In order to operate the electro-optical effect of the liquid crystal layer, the display laminate may be provided with suitably arranged electrodes, also referred to as electrode layers. Having only a single substrate and no cover layer or a cover layer whose surface is not particularly suitable for applying electrodes thereon, which is for example the case if the cover layer is of an organic material on which ITO electrodes are to be provided by sputtering, it is convenient to provide the electrodes on the substrate side of the liquid crystal layer. In the art such an electrode arrangement is referred to as in-plane switching.

FIG. 3 shows, schematically, a plan view of an embodiment of a display laminate in accordance with the invention comprising an in-plane switching electrode arrangement, and FIG. 4 shows, schematically, a cross-sectional view along the line I—I of FIG. 3.

The display laminate 300 has a single substrate 2 provided with a pair of interdigitated electrodes 8a and 8b for in-plane switching the liquid crystal layer 4 The substrate 2 is provided with an alignment layer 12 and confines a switchable liquid crystal layer 4 and the liquid crystal layer 4 is covered by a cover layer 6. In order to further increase the mechanical stability of the laminate 300 supporting members 10 are provided. The area within the supporting members 10 is switchable by means of the electrodes 8a and 8b.

The liquid crystal layer 4 is anisotropically oriented in a planar state.

LC electro-optical effects which are operable by an in-plane switching electrode arrangement include switching between a homeotropic oriented state and a planar oriented state. To enhance the visibility of the electro-optical effect to the unaided eye of the liquid crystal layer two polarizers, one on each side of the liquid crystal layer are to be used. On the other hand, if a dichroic dye is added to the liquid crystal layer to produce a guest-host liquid crystal layer, a single polarizer is sufficient. An in-plane switching laminate having a wide viewing angle independency is obtained by using an LC effect in which the liquid layer is switched from a first planar oriented state to a second planar oriented state, the optical axes system of the first and the second state being rotated with respect to another. To improve visibility of the E/O effect two polarizers are required, one on each side of the liquid crystal layer. By adding a dichroic dye one polarizer is sufficient. Also a CTLC effect may be used in combination with in-plane switching.

In order to increase the area of the liquid crystal layer which can be switched it is convenient to use interdigitated electrodes. In order to be able to switch the liquid crystal layer in-plane the tines of the interdigitated electrodes must be positioned sufficiently close together, typically 10 μm. The laminate may contain one pair of interdigitated electrode per pixel or more than one pair. If the laminate contains support structures electrodes or parts thereof may be buried under such support structures.

FIGS. 5A and 5B show stages of a method of manufacture in accordance with the invention of the laminate shown in FIGS. 3 and 4.

In the method in accordance with the invention, a substrate 2 is provided with an electrode layer 12, the electrode layer 12 being a patterned layer comprising the interdigitated electrodes 8a and 8b. Onto the layer 12, a layer of photo-polymerizable stratified-phase-separable material 3 is wet deposited. Using a mask 13, the layer 3 is pattern-wise irradiated with actinic radiation. Only in the illuminated regions photo-polymerization takes place and a gradient in monomer and liquid crystal molecules is set up as a result of which liquid crystal molecules diffuse out of the illuminated regions and photo-polymerizable monomers diffuse into the illuminated regions. Thus the supporting members 10 are formed in the illuminated regions as shown in FIG. 5A. The non-illuminated regions there is still stratified-phase-separable material available. As shown in FIG. 5B, in a second exposure, a blanket exposure, ie without a mask, the stratified-phase-separable material is stratified to form an liquid crystal 4 and a cover layer 6.

FIG. 5 shows, schematically, in cross-section, another embodiment of a display laminate in accordance with the invention.

The laminate 500 has a stratified-phase-separable composite 7 comprising a liquid crystal layer 4 and a cover layer 6 provided on a single substrate 2 having an electrode layer 8 which may include an orientation layer to orient the liquid crystal molecules of the liquid crystal layer 4. To stabilize the stratified-phase-separated composite, supporting members 10 are provided using the method described hereinabove in relation to FIGS. 5A and 5B. The supporting members so formed have, in this embodiment, led to an uneven cover layer surface 6a.

FIG. 6 shows, schematically, in cross-section, a further embodiment of a display laminate in accordance with the invention.

The laminate 600 has alternative means to mechanically stabilize the stratified-phase-separated composite 7 comprising a cover layer 6 and a liquid crystal layer 4 in the form of spacers 11. The diameter of the spacer 11 is larger than the thickness of the liquid crystal layer 4. The spacer is partially embedded in the cover layer 4 and bridges the cover layer 6 and single substrate 2.

Sandwich Electrode Arrangement

Another embodiment of the laminate in accordance with the invention is characterized in that the liquid crystal layer or a part thereof is sandwiched between a bottom electrode disposed on the substrate side of the liquid crystal layer and a top electrode disposed on the side of the liquid crystal layer remote from the single substrate for subjecting the liquid crystal layer or the said part thereof to an electric field, the top electrode preferably a wet-deposited electrically conducting material.

The number of LC effects which may be operated with an in-plane switching electrode arrangement is limited and does not include the more common LC effects such as the twisted nematic (TN) and the super twisted nematic (STN) effect. To expand the number of LC effects which are operable using the laminate, in particular to include the more commonly used LC effects or to obtain another embodiment of the in-plane switching arrangement, the liquid crystal layer is sandwiched between electrodes.

FIG. 7A shows, schematically, a plan view of an embodiment of a display laminate in accordance with the invention having a sandwich electrode arrangement, FIG. 7B shows, schematically, a cross-sectional view along the line II—II of FIG. 7A.

The laminate 700 has a single substrate 2 provided with bottom electrodes 8a which are covered with an orientation layer 12. The liquid crystal layer 4 and cover layer 6 may together form a stratified-phase-separated composite. The cover layer is preferably a polymeric layer. To mechanically stabilize the laminate supporting members 10 are provided.

The laminate 700 further comprises a top electrode layer 8b. By providing the top electrode 8b on the side facing away from the liquid crystal layer 4 the cover layer 6 may conveniently serve as a substrate for the subsequently provided top electrode.

In principle, the electrode layer 8 may be formed from any electrically conducting material. However, not every material is equally suitable. For example, although indium tin oxide (ITO) is a preferred electrode material in terms conductivity and transparency (if such transparency is required) it is not a convenient electrode material for the top electrode in many embodiments of the laminate in accordance with the invention, because the laminate is not a convenient substrate for the processing of ITO. The sputtering process used to apply ITO may damage the laminate. This is particularly the case if the laminate has no cover layer or a polymeric layer.

In a preferred embodiment the top electrode 8b comprises an organic electrically conducting material such as a metal filled polymer, such as Ag-filled epoxy, or a conducting polymer such as a polythiophene a polypyrrole or a polyaniline. Such material and conducting polymers in particular have the advantage of being obtainable using a wet deposition method which is compatible with the underlying layers, in particular the cover layer 6.

If the conducting polymer needs to be transparent a poly-ethylenedioxythiophene (PEDOT) or a poly-aniline may be used. Moreover, if the top electrode or a plurality of such electrodes is to be provided in accordance with a pattern, such patterning may be conveniently performed using a printing method or photo-chemical patterning method.

The thickness of the bottom electrode is typically 100 to 200 nm. The thickness of the top electrode is typically 100 to 500 nm.

To reduce the voltage drop and dielectric losses, the cover layer 6 below the top electrode 8b is preferably made as thin as possible, for example 1 to 5 μm. If due to the reduced thickness, mechanical integrity is compromised further cover layers may be provided after the top electrode has been provided.

The laminate 700 comprises an intermediate layer 14 provided between the cover layer 6 and the top electrode layer 8b.

Such an intermediate layer may be necessary in order to render the cover layer 6 compatible with the method of providing the top electrode layer 8b. For example, the wetting of the top electrode coating material may need to matched to that of the cover layer. In case a polymer cover layer of a stratified-phase-separated composite is to be provided with an aqueous-based top electrode coating material the cover layer surface may be treated by an oxygen plasma or UV/ozone or a wetting layer of a more hydrophilic material than the cover layer material may be applied, such as a layer comprising poly(hydroxyethylacrylate), poly (acrylic acid), poly(tripropyleneglycol diacrylate) or copolymers containing units of these compounds.

In addition or alternatively, the intermediate layers may have the function of planarizing the cover layer 6 (if needed) and/or to further mechanically stabilize the laminate 700.

In case the LC display laminate is used for a reflective display, a reflective, preferably metallic, top electrode for reflecting light transmitted by the laminate towards the viewer may be used.

If the conductivity of a transparent top electrode material is too low, which may in particular be the case for display device in which the top electrodes 8b are to be highly transparent, the conductivity of the top electrode 8b may be increased by providing auxiliary electrodes 8c thereon, the auxiliary electrodes being made of a material having a higher conductivity than the top electrode material. Being highly conductive the electrodes 8c may occupy a significantly smaller area than the transparent top electrode 8b. Because they occupy such a small area the may be opaque which considerably enlarges the range of suitable electrode materials.

The auxiliary electrodes 8c may be conveniently positioned on the supporting members 10, so as to maximize active display area. An attractive method of providing auxiliary electrodes 8c is available in case the cover layer 6 has an uneven surface. Such an uneven surface is often obtained when a stratified-phase-separated composite is used to obtain a liquid crystal layer and cover layer as is shown in FIG. 8.

FIG. 8 shows, a measured cross-sectional profile of an interface of an embodiment of a laminate in accordance with the invention. The embodiment of the laminate comprises a stratified-phase-separated composite stabilized by supporting members. At the location of the supporting members (the large peaks in FIG. 8) the surface is a few μm higher than in the area where the liquid crystal layer is located (the low broad peaks). Thus the laminate is highest at the locations of the supporting members. The location of the supporting members correspond with inactive areas of the display. The method comprises simply pressing the surface in a layer of silver paste of such that only the highest portions at the locations of the supporting members are submerged in the layer silver paste. As a result 'wet' silver paste is selectively deposited at the locations of the supporting members. The paste is then solidified by curing at moderate elevated temperatures. The method is self-aligned and does not need screen printing or other coating techniques that acquire aligning steps.

As an example, although the conductivity of the PEDOT film is limited, the overall net conductivity is enormously improved by the conductive lines of silver paste that are in direct electrical contact with the PEDOT.

In another preferred embodiment of a passive matrix device comprising a laminate in accordance with the invention having which a top electrode layer in the form of an array of column electrodes, conductivity-enhancing auxiliary electrodes may be printed along the column electrodes on inactive areas of the display to increase the conductivity of the column electrodes.

The top electrode layer 8b of the laminate 700 forms a single continuous sheet of conducting material. Such a continuous sheet can be suitably used in a segmented display or an active matrix display wherein the bottom electrodes 8a are individually addressable using an active switch such as a TFT. If the top electrode layer 8b is patterned to form array of individually addressable columns which cross with row electrodes 8a a passive matrix display laminate is obtained. In such pixelated displays auxiliary electrodes 8c may be positioned between pixels so as to maximize active display area.

LC effects which are operable in a sandwich electrode arrangement include the TN, STN effect, electrically controlled birefringence (ECB) and optically compensated birefringence (OCB), vertically aligned nematic (VAN) and ferro-electric liquid crystal effect (FLC), each of these effects requiring one or more polarizers to make the LC effect visible.

LC effects which do not require polarizers to make e/o effect visible can also be suitably used. Such effects include scattering type LC effects, such as polymer dispersed liquid crystal (PDLC), liquid crystal gels, liquid crystal layer filled particles such polymer or silicon dioxide particles, can also be used. Further, a guest-host LC effect in which a dichroic dye or mixture of such dyes is added to a liquid crystal layer may be used. The scattering and guest-host may be combined to improve the contrast of the display in which the laminate is used. A CTLC effect can also be used.

In particular embodiments to be discussed hereinbelow, the laminate in accordance with the invention may be combined with or may comprise further functional layers.

FIG. 9 shows, schematically in a cross-sectional view, an embodiment of a one-polarizer reflective display comprising a display laminate in accordance with the invention comprising further functional layers. The laminate 900 comprises a stratified-phase-separated composite 7 comprising an liquid crystal layer 4 and cover layer 6, the composite 7 being supported by a single substrate 2. between the single substrate 2 and liquid crystal layer 4 an electrode layer 8 is disposed for in-plane switching of the liquid crystal layer 4. The laminate 900 comprises further functional layers, viz. orientation (alignment) layer 20, planarization layer 22, a first wet-deposited retarder layer 22, a second wet-deposited retarder layer 24, a wet-deposited polarizer layer 28 and a reflector layer 30. Each of said further functional layers is discussed in more detail hereinbelow.

Alignment Layer

An embodiment of the laminate in accordance with the invention is characterized in that the single substrate is, on the liquid crystal layer side, provided with an alignment layer for orienting the liquid crystal layer.

In a preferred embodiment of the laminate in accordance with the invention comprising a cover layer and liquid crystal layer in the form of a stratified-phase-separated composite, an alignment layer for orienting the liquid crystal layer is provided between the liquid crystal layer and the cover layer.

The thickness of the alignment layer may be as small as a molecular monolayer, or typically 20 to 100 nm.

The liquid crystal layer, or a part thereof, of the laminate in accordance with the invention is in an anisotropically oriented state or is capable of being brought in such a state by subjecting the liquid crystal layer or the part thereof to an electric field. During manufacture and/or during use of the laminate such an anisotropically oriented state or the capability of forming such a state may not come about spontaneously. Typically, during manufacture and/or use of the laminate means are used which assist in forming such a state, eg during manufacture of the liquid crystal layer it may be subjected to an electric field to obtain required orientation of the liquid crystal layer. Alternatively, the single substrate of the laminate may comprise a surface which is capable of inducing the required orientation of the liquid crystal layer. A means to provide such a surface is an alignment layer also referred to as an orientation layer.

Typically, the alignment layer is positioned to cover the electrodes provided on the single substrate side of the liquid crystal layer.

Such an alignment layer is conventional and may for example be a rubbed polyimide layer to induce a nematic orientation of the liquid crystal layer. Instead of providing the aligning capability by rubbing, alignment may be induced by photo-polymerizing a monomeric composition using polarized radiation, a process known in the art as photo-alignment. If such an alignment layer is combined with a liquid crystal material comprising chiral dopants a twisted planar nematic orientation, such as a TN or STN orientation, is obtainable. As is also known in the art, in order to facilitate a nematic homeotropic orientation of the liquid crystal layer, an alignment layer consisting of a monolayer of surfactant molecules may be used which preferably settle on the interface between the liquid crystal layer and the layer adjacent thereto. Specific non-rubbed polyimides can be used to obtain a homeotropic alignment.

Since the laminate in accordance with the invention has a single substrate it is in general difficult to apply an alignment layer on the liquid crystal layer side remote of the single substrate to facilitate orientation from that side. However, if the laminate comprises a stratified-phase-separated composite an alignment layer may also or alternatively be used on that side.

In a first embodiment comprising such an alignment layer, use is made of stratified-phase-separable material comprising a surfactant which during stratification preferably settle as a monolayer on the interface between the liquid crystal layer and the solid layer of the composite. If the composite comprises a polymeric layer obtained from monomers, the surfactant preferably comprises polymerizable group during stratification copolymerizes with the polymeric layer. The monolayer of surfactant serves as an alignment layer for the liquid crystal layer. In particular, a homeotropic alignment can thus obtained as in general the surfactant molecules are rod-shaped and orient which their long axis normal to the liquid crystal layer.

Suitable surfactants are $C_4$ and higher alkanes or cycloalkylalkanes functionalized with polymerizable groups such as acrylates, epoxies or thiols, such as the alkylacrylates, ethylhexylacrylate, fluorinated alkylacrylates, and alkylthiols.

In a second embodiment of a laminate in accordance with the invention having an alignment layer provided on the liquid crystal layer side remote from the substrate, in particular one which facilitates a planar orientation of the liquid crystal layer, photo-alignable monomers are mixed with the stratified-phase-separable composition which, when photo-polymerized using polarized light during the stratification process, re-orient to form anisotropic polymer layer which is capable planar orienting the liquid crystal layer formed during stratification. In general, the liquid crystals orient in a direction perpendicular to the E-vector of the polarized UV light. In this second embodiment the alignment layer and cover layer are formed concurrently from the same material producing one integral layer.

Polarizer Layer

To enhance the visibility of the electro-optical LC effect attainable by the liquid crystal layer, the display laminate in accordance with the invention comprises or is combined with one or more polarizing layers.

The number, typically 1 or 2, position, orientation of the polarization and type, eg circular or linear, reflective or absorbing, of the polarizer to be used depends on the type of LC effect used and type of display desired. Conveniently, a polarizer may be positioned adjacent the single substrate, either on the liquid crystal layer side thereof or the side facing away of the liquid crystal layer.

In the broadest sense, the choice of polarizer material is not essential to the invention and as such any conventional polarizer may be suitably used. For example, the polarizer may be a conventional absorbing polarizer such as an iodine-doped polyvinylacetate foils or a conventional reflective polarizer foils such as the Bragg-reflector laminate disclosed in U.S. Pat. No. 6,025,897 a cholesteric polarizer film disclosed in U.S. Pat. No. 5,506,704.

Most of these conventional polarizers are available as ready-to-use foils and may be laminated on the substrate using pressure sensitive optical glue. Moreover, their thickness typically amounts a few 100 μm thus making up a significant part of the total thickness of the laminate in accordance with the invention and display comprising such laminate.

In order to provide a LC laminate having a polarizer layer which is thinner yet can be easily manufactured, a preferred embodiment of the laminate in accordance with the invention comprises a polarizer layer obtainable by a wet deposition method, in particular a wet coating or a printing method. Wet deposition methods allow the deposition of thin polarizer layers in a controlled manner at low cost. Moreover, such methods are compatible with and easily integrated in a roll-to-roll manufacturing process.

An embodiment of a linear absorbing polarizer layer obtainable by a wet deposition method is a polarizer layer composed of an oriented lyotropic dichroic dye present in a crystalline state. Such a polarizer layer, which is known per se, see eg Bobrov et al in SID 01 DIGEST, pp 639–641 (2001), is obtainable by mixing the lyotropic dichroic dye with a solvent to form an isotropic composition, deposit a thin film having a controlled thickness of the mixture on the surface to be coated, orienting the thin film so formed, and then evaporating the solvent causing the wet film to transform into the glassy and then to the crystalline state thus forming the polarizer layer in which the polarizer material is present in the crystalline state.

Another embodiment of an absorbing polarizer layer obtainable a wet deposition method is a polarizer layer of a soluble polarizer material comprising an anisotropically oriented LC compound and a oriented dichroic dye having an orientation complying with the orientation of the LC compound, where the polarizer material is present in a glassy state for maintaining the orientation of the material and the LC compound may be a liquid crystal polymer, oligomer or low molecular weight compound. Alternatively, the dichroic dye and anisotropically oriented LC compound may be combined in one compound to form an anisotropically oriented LC dichroic dye, where the dye may be a polymeric dye, an oligomeric dye or a low molar mass dye. The oriented dichroic dye causes the polarizer layer to be dichroic, that is an absorption which is anisotropic along different axes of the polarizer layer.

Such a polarizer layer is obtainable by mixing the polarizer material with a solvent to form a polarizer film-forming material capable of being anisotropically oriented and capable of being wet deposited as a thin film of controlled thickness, and then depositing and orienting the wet thin film and evaporating the solvent thus forming the polarizer material in the glassy state as a thin polarizer layer.

Yet another embodiment of a polarizer layer obtainable by wet deposition is a polarizer layer of a, typically insoluble and polymerization-initiator-containing, polarizer material comprising an anisotropically oriented, preferably cross-linked, LC polymer and an oriented dichroic dye having an orientation complying with the anisotropic orientation of the LC polymer. Alternatively, the dichroic dye and anisotropically oriented LC polymer may be combined to form an anisotropically oriented LC dichroic dye. Preferably, the polymer is photo-polymerized, in which case the material typically contains a photo-initiator.

Such a polarizer layer is obtainable from a polarizer film-forming material comprising LC monomers having reactive groups and a dichroic dye and, optionally, a solvent, the polarizer film-forming material capable of being deposited using a wet deposition method to produce a thin film of controlled thickness, and capable of being oriented in an anisotropically oriented state, wet-deposit a thin wet film of the polarizer film-forming material, orienting the thin wet film and curing the thin wet film to polymerize the LC monomers while maintaining the orientation to form the polarizer layer.

In general, the thickness of a polarizer is in the range of 0.1 to 100 µm. Stretched polarizer film generally have a large thickness, typically 10 to 100 µm, whereas polarizers obtained by wet deposition, and in particular the polarizer layers of the embodiments described hereinabove may have a small thickness, typically 0.1 µm to 10 µm, in particular 0.2 to 5 µm, or more particular 0.4 to 0.5 µm.

The manufacture of polarizer layers obtainable by wet deposition described hereinabove may require the use of orientation means to orient the thin film of polarizer film-forming material. Such orientation means may be provided in the form of a the substrate surface onto which the polarizer layer is to be wet-deposited may be a surface capable of aligning the polarizer material to be oriented. Such a surface may be provided by a separate alignment layer. Examples of such alignment layers have been described hereinabove. Alternatively, the deposition method used to apply the film may cause the wet film to become oriented while being deposited. Examples of such deposition methods are knife coating, doctor blading, wired rod coating, extrusion coating, and die-slot coating.

Retardation Layer

Depending on the type of LC effect, the optical performance of the electro-optical effect, such as contrast or viewing angle dependence may be further improved by means of a retardation layers. Therefore, a preferred embodiment of the laminate in accordance with the invention comprises or is combined with one or more retardation layers.

Generally, a retardation layer is a transparent, optically anisotropically film, in particular anisotropic in refractive index. Typically, as is known in the art, the retardation layer may be made of a polymer which is anisotropically oriented by means of stretching the film. Thus, a birefringent, uniaxially or biaxially oriented is obtained. Such a stretch oriented polymer film may be laminated onto a substrate surface using pressure sensitive optical glue.

In order to provide a LC laminate having a retardation layer which is thin and easily manufactured, a preferred embodiment of the laminate in accordance with the invention comprises a polarizer layer obtainable by a wet deposition method. Wet deposition methods allow the deposition of thin retardation layers in a controlled manner at low cost. Moreover, such methods are compatible with and easily integrated in a roll to roll manufacturing process.

Obviously, the thickness of retardation layer is to be selected in accordance with the amount of retardation desired. quarter $\lambda$, half $\lambda$ etc. Generally, the thickness of a retardation layer varies from 0.05 to about 100 µm. In the case of retardation layer in the form of a stretched polymeric foil such as a polycarbonate foil, the thickness is typicaly 10 to 100 µm, whereas a wet deposited retardation layer has a typical thickness of 0.05 to 10 µm, or in particular 0.1 µm to 5.0 µm, or more particular 0.2 to 1.0 µm. Such a thickness is much less than conventional retarders, allowing any display comprising wet-deposited polarizers to be thinner.

Suitable embodiments of retardation layers obtainable using a wet deposition method are identical to the embodiments of the polarizer layers described hereinabove which are obtainable using a wet deposition method and comprise a dichroic dye as a compound separate from the compound providing the anisotropic orientation, with the exception that the retarder layer embodiment does not comprise the dichroic dye.

A further embodiment of a retardation layer obtainable using a wet deposition is a retarder layer comprising a soluble anisotropically oriented LC compound, such as a polymer, oligomer or low molar mass compound, which is present not in the glassy state but in a crystalline state, monolithic or poly-crystalline. A crystalline state is in general more highly ordered than a glassy state and consequently may have a large intrinsic optical anisotropy (high birefringence). A large intrinsic optical anisotropy is needed for a thin retardation layer.

A furhter embodiment of the laminate in accordance with the invention comprises a retardation layer having a splay orientation. Such a splay-oriented retardation layer is obtainable from a retardation-layer-forming material comprising liquid crystal material and a surfactant which, during manufacture, preferentially settles on the air/liquid crystal interface of a thin film formed from the retardation-layer-forming material, and which, when so settled, is capable of orienting near by liquid crystal molecules homeotropically. Surfactants capable of inducing homeotropic alignment generally have an elongated shape and settle on the interface with elongate axis normal to the interface. Examples of surfactants described provided hereinabove in the context of orientation layers may be suitably for the splay-oriented retardation layer as well. The surfactant may also be liquid crystalline. When the retardation-layer-forming material comprising the homeotropic-orientation-inducing surfactant is wet deposited on a substrate surface capable of orienting the liquid crystal molecules of the retardation-layer-forming material near by the substrate in a planar alignment, a splay-oriented film of retardation-layer-forming material results which may then be subsequently converted into the splay-oriented retardation layer to fix the said orientation by evaporation of the solvent or polymerization.

A display laminate having improved display properties may be obtained by providing a stack of retardation layers of the type described hereinabove, the optical axes of the retardation layers in the stack being rotated with respect to each other. The stack may alternately need to comprise alignment layers to obtain the desired rotation of orientation form retardation layer to another.

Reflector Layer

To render the laminate in accordance with the invention suitable for application in a reflective display, an embodiment of the laminate in accordance with the invention comprises or is combined with a reflector layer.

The LC display laminate may be suitably used for a reflective or transflective LC display device. Generally, such a display device has a reflecting means on the side of the liquid crystal layer remote from the viewer for reflecting light which has been transmitted by the liquid crystal layer back towards the viewer. Such reflecting means may be provided using reflective electrodes or a light reflecting layer provided on the outside on the LC cell, that is at a substrate side remote from the liquid crystal layer of the display device.

However if used in combination with a single substrate LC laminate in accordance with the invention, the light reflector layer may also be provided on the liquid crystal layer side of the single substrate. Being arranged that close to the liquid crystal layer is of advantage as it reduces parallax. If the laminate comprises, disposed between the single substrate and liquid crystal layer, electrodes, the reflector layer may be arranged between the liquid crystal layer and the electrodes, or, preferably in order to reduce the operating voltage and capacitance losses, on the single substrate side of the electrodes as is shown in FIG. 9. In any case, the reflector layer should not cause short-circuits between the electrodes which may be conveniently avoided by using a reflector layer made of an electrically insulating material or by providing an insulator layer between the reflector layer and the electrode layer.

In an embodiment of the laminate in accordance with the invention, the laminate is combined with a reflector layer comprising a stack of inorganic dielectric layers, an alternating stack of organic or polymeric layers, adjacent layers of the stack having different refractive indices. Such light-reflecting stacks are well known in the art. Conveniently, such a stack may be used as the single substrate.

In a particular embodiment, a polarization-selective reflector layer may be used which has the combined function of a reflector layer and a polarizer layer. Such polarization-selective reflector layers are known as such and are in the art also referred to as reflective polarizers, examples being a cholesteric broadband polarizer as disclosed in eg U.S. Pat. No. 5,506,704 and the Bragg-reflector laminate disclosed in U.S. Pat. No. 6,025,897. Preferably, the polarization-selective reflector layer is combined with a light absorbing coating, provided either on the liquid crystal layer side of the single substrate or the side opposite thereof to absorb any light (inadvertently) transmitted by the polarization-selective reflector layer.

In a preferred embodiment of a laminate in accordance with the invention comprising a UV stratified-phase-separated composite, the reflector layer preferably does not reflect UV light as this upsets the stratification process. The Bragg-reflector laminate disclosed in U.S. Pat. No. 6,025,897 is an example of such a reflector layer.

In another embodiment of the laminate in accordance with the invention, the laminate is combined with a reflector layer provided on the liquid crystal layer side remote from the single substrate, that is the top side. Since the reflector layer may be arranged directly adjacent to or near, only separated by a thin cover layer, the liquid crystal parallax effects are reduced. All the reflector layers mentioned hereinabove can also be suitably used if the reflector layer is provided at the top. In particular common conductive reflector layers can be used, such as metal layers made of eg Al or Ag. The laminate may comprise a top reflector layer obtainable by a wet deposition method or obtainable by lamination. The laminate may be obtained by coating a paste of Ag particles in a polymeric binder. Preferably, aluminium foil is laminated with pressure sensitive glue. Silverlux film marketed by 3M may also be used.

The laminate reflector combinations described herinabove may also be used for a transflective display with the proviso that the reflector layer should not be fully but half-reflecting.

Other Layers

Apart from the layers described hereinabove, the laminate may comprise or may be used in combination with other layers. For example, if during manufacture of a laminate an uneven substrate surface is formed which may impede the provision of further layers, a planarization layer may be used to obtain an even substrate surface. The laminate may also comprise or be combined with a color selection layer for obtaining multi-color or full-color RGB displays. Conventional absorptive color filter may be used for this purpose, but a cholesteric color filter is particularly suitable. Scratch resistant layers or other layers for resisting the effect of ambient stimuli may also be provided. To suppress specular reflections scattering layers may be provided. A black matrix layer covering the inactive areas of the display laminate to improve contrast may also be used.

Display Configurations

A preferred embodiment of the invention relates to a display device comprising a display laminate in accordance with the invention. The display laminate may simply contain a single switchable area having a specific shape or it may comprises individually addressable segments to provide a segmented display. In particular, the laminate may be used to provide a display device comprising a plurality of individually addressable pixels in monochrome, multi color or full RGB color. The pixelated display may be a passive matrix display in which the pixels are formed near crossings of an array of column electrodes with an array of row electrodes. The display may be a active display device where pixels are driven using an active device such as a thin film diode or thin film transistor (TFT).

The laminate in accordance with the invention may be used for a reflective, a transmissive, or a transflective display. FIG. 9 show an embodiment of a laminate in accordance with the invention for use in a reflective display device.

FIG. 10 shows, schematically in a cross-sectional view, an embodiment of a two-polarizer display device comprising a display laminate in accordance with the invention comprising further functional layers.

The display laminate 110 is a laminate for use in a reflective display device. It comprises a substrate 2, a reflector layer 30, a first polarizer layer 28a, an electrode layer 8, an alignment layer 20, a liquid crystal layer 4 and cover layer 6 in this embodiment forming a stratified-phase-separated composite 7 and a second polarizer 28b. Since none of the layers of the said plurality of layers of which the laminate in accordance with the invention consists or any laminate comprising a subset thereof is identical to the substrate 2, the substrate 2 is a single substrate.

The reflective laminate 110 can be easily transformed to a laminate for use in a transmissive display by for example replacing the reflector layer 30 with an edge-lit back light arrangement. A transflective display device may be obtained by adding a back light and making the reflector layer 30 half transparent.

Another embodiment of a transflective display, the half-transparent reflector layer comprises a polarization-selective reflector layer and a polarizer arranged on the reflector layer side facing away from the liquid crystal layer, the polarization-selective reflector layer being patterned such that, within each pixel of the display, the reflector layer has an area which is transmissive in the visible range and an area which is reflective in the visible range. An example of such a polarization-selective reflector is a cholesteric layer which in the reflective areas is oriented to reflect incident light, and in the transmissive areas is in an isotropic state or a reflective state wherein the reflection wavelength band is outside the visible range. Such a cholesteric layer may be obtained by pattern-wise curing photo-polymerizable cholesteric layer forming material.

EXAMPLE 1

A display laminate shown in FIG. 1 which is manufactured in accordance with a method shown in FIGS. 2A–2C as follows:

A stratified-phase-separable coating material is provided having the following composition:
50 wt % liquid crystal material E7,
44.5 wt % photo-polymerizable isobornylmethacrylate (formula A1),
0.5 wt % photo-initiator (formula A2), and
5.0 wt % light-absorbing photo-polymerizable stilbene dye (formula A3).

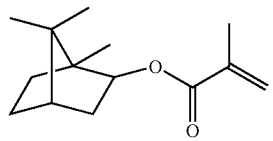
A1

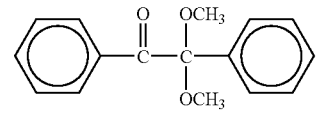
A2

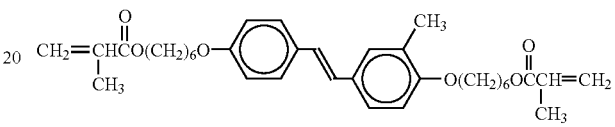
A3

Liquid crystal material E7 is marketed by Merck and comprises a mixture of cyanobiphenyls and a cyanoterphenyls and the photo-initiator A2 is marketed under the trade name Irgacure 651 by Ciba Geigy. The light-absorbing stilbene monomer A3 was obtained using the method given below.

Synthesis of (E)-4,4'-di-(6-methacryloyloxyhexyloxy)-3-methylstilbene A3 (Identified as 1 in the Reaction Scheme Below).

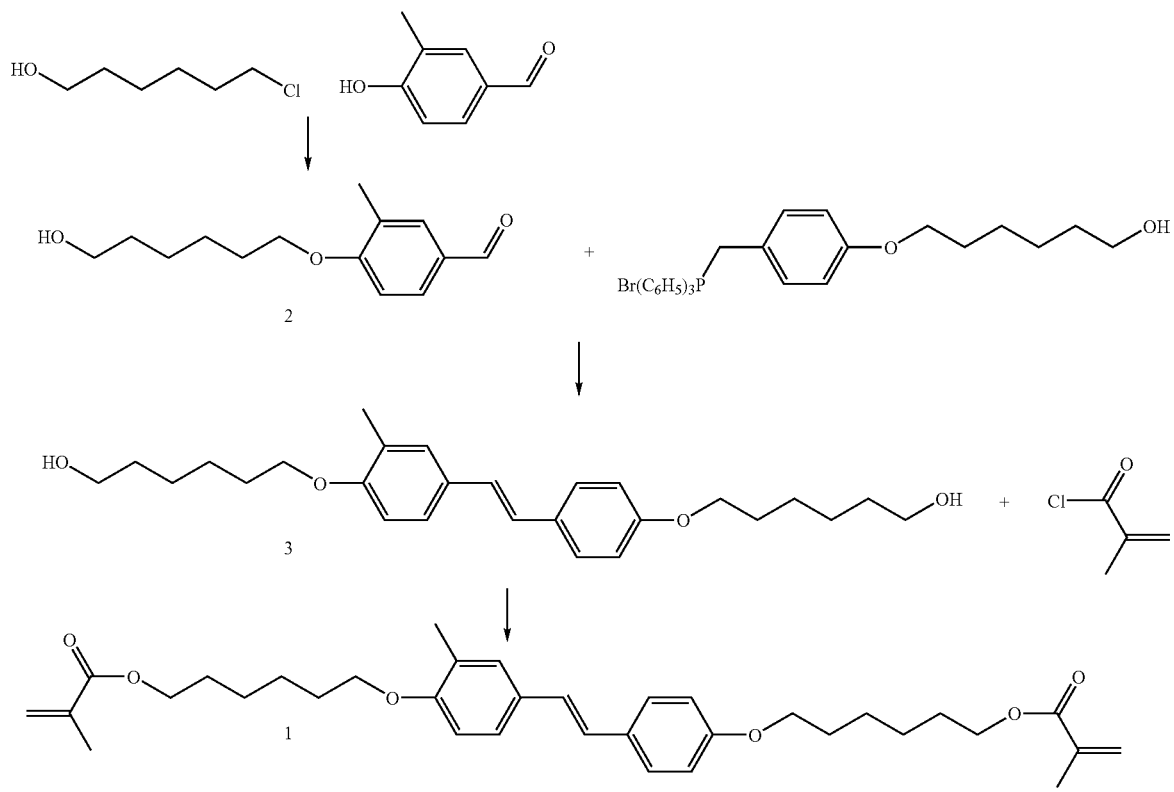

A: 4-(6-hydroxyhexyloxy)-3-methylbenzaldehyde (2).

A mixture of 54 g (400 mmol) of 4 hydroxy-3-methylbenzaldehyde, 53 ml (400 mmol) of 1 chloro-6-hexanol, 12 g of NaI (74 mmol) and 250 ml of ethanol was heated till reflux. 27 g (400 mmole) of KOH in 30 ml of water was added dropwise. After 16 hours the solvent was evaporated. The crude product was mixed with 200 ml of ethyl acetate and 200 ml of water. After separation the aqueous layer was extracted with 200 ml of ethyl acetate. The combined organic layers were then extracted twice with 200 ml of a 5% NaOH solution and once with 200 ml of a saturated NaCl solution. The organic solution was dried with magnesium sulphate and evaporated. 60 g of the product (63%) was obtained.

B: (E)-4,4'-di-(6-hydroxyhexyloxy)-3-methylstilbene (3).

1.3 g of lithium (190 mmol) was added in small pieces to 1000 ml of ethanol. After dissolution, the reaction flask was placed in an ice-bath. 44 g (170 mmol) of 4-(6-methacryloyloxyhexyloxy)-3-methylbenzaldehyde (2) was added and the solution was stirred for 5 minutes, then 93 g (170 mmol) of 4-(6-hydroxyhexyloxy)benzyl triphenylphosphonium bromide (prepared according to a procedure published by Van de Witte et al, Liq. Cryst. (1998), 24, 819–827.) was added. After stirring for 24 hours at room temperature, 50 ml of water was added and stirring was continued for one hour. 26 g of the product (36%) was obtained by filtration, washing with 300 ml of ethanol, and drying at 60° C. in vacuum.

C: (E)-4,4'-di-(6-methacryloyloxyhexyloxy)-3-methylstilbene (1).

6.1 ml (0.063 mol) of methacryloyl chloride was added dropwise to a solution of 12.2 g (0.029 mol) of (Z)-4,4'-di-(6-hydroxyhexyloxy)-3-methylstilbene (3) and 17.6 ml (0.125 mol) of triethylamine in 100 ml of dichloromethane cooled in an icebath. The mixture was stirred overnight at room temperature under nitrogen. The solution was subsequently extracted twice with 500 ml of 2.4 M HCl and once with 100 ml of brine. The organic solution was dried over magnesium sulphate, passed through a small silica filter and evaporated. 10.4 g of the pure compound (64%) with mp=72° C. was obtained after crystallisation from ethanol.

A glass substrate 2 which carries a rubbed polyimide alignment layer for orienting the liquid crystal material E7 is provided. The substrate 2 has a thickness of about 1.1 mm. There is no particular reason for the substrate to have this thickness. Thinner conventional substrates of glass or plastic with thicknesses down to 0.4 mm may also be used. The thickness of the alignment layer is estimated to be about 100 to 200 nm. Referring to FIG. 2B, a 10 µm film 3 of the said stratified-phase-separable coating material is coated on the glass substrate 2 using a blade coating apparatus at room temperature. The film 3 thus formed is then exposed to UV light (lamp type: Philips TL-08, 0.5 mW/cm²) for 15 minutes at a temperature of 60° C. Upon exposure to said UV light, due to the presence of the light absorbing compound A3, a light intensity gradient is set up in the direction normal to the substrate 2. The light intensity being highest near the top of the film 3, polymerization selectively occurs in the near the film/air interface. The polymer formed by the UV exposure is not miscible with the liquid crystal material E7 and thus phase separates from the liquid crystal material. Under the influnece of the blanket exposure and the light intensity gradient, the phase separation proceeds in the form of a stratification process in which a separate polymer layer is formed on top of the liquid crystal layer of E7, wherein the liquid crystal layer is formed on the substrate side of the polymeric layer. As a result of the intensity gradient, monomeric material A1 is selectively depleted at the top of the film 3, more in particular at the interface of the liquid crystal layer and polymer layer being formed, as a result of which a diffusion gradient in monomer A1 (and A3) concentration is set up as a result of which monomer material A1 (and A3) is continuously fed to the liquid crystal layer/polymer layer interface which allows the stratification process to proceed further finally resulting in a stratified-phase-separated composite 7 formed from an about 5 µm thick polymer cover layer 6 of polymerized A1 and A3 monomers and an about 5 µm thick liquid crystal layer 4 of E7, as shown in FIG. 2C.

Of a laminate in accordance with the invention thus manufactured, the liquid crystal material is recovered from the stratified phase-separated composite 7 and its transition temperature is measured. The measured transition temperature is the same as that of fresh liquid crystal material E7, which demonstrates that the liquid crystal layer 4 of the stratified phase-separated composite 7 essentially consists of liquid crystal material E7.

The liquid crystal layer is an electro-optical layer as its reflection/transmission characteristics can be reversibly switched by subjecting the composite to an external electrical field, the electro-optical effect rendered visible by placing the stratified phase-separated composite layer between crossed first and second polarizers.

If the stratified-phase-separated composite is aligned such that the rubbing direction of the polyimide layer makes an angle of 45° with the polar axis of each of the two polars, the laminate has a maximal transmission indicating that the liquid crystal layer LC molecules have a more or less planar alignment. With the laminate sandwiched between electrodes and a suitable voltage applied, the display laminate turns dark indicating that LC molecules adopt a homeotropic alignment in which case the light polarized by the first polarizer incident on the LC layer does not experience birefringence as a consequence of which the polarization direction of the incident light is not changed and hence absorbed by the second polarizer. After removal of the voltage the cell turns bright again. This process can be repeated over and again

EXAMPLE 2

An embodiment of a laminate in accordance with the invention as shown in FIGS. 3 and 4 is manufactured in accordance with the invention with a method of with stages are shown in FIGS. 5A and 5B as follows:

A glass plate 2 (1.1 mm) is provided a patterned indium tin oxide electrode layer comprising a plurality of interdigitated electrodes 8a and 8b. In this particular example, the tines of the electrodes 8a and 8b are about 20 mm long, 9 µm wide and about 100 nm thick and the edge-to-edge distance between the tines 8a to 8b is about 9 µm resulting in a pitch of 18 µm. The tines of electrodes 8a and 8b are grouped to form independently addressable pixels which measure about 24 mm by 1 mm. Being provided in this manner the electrodes are capable of in-plane switching a liquid crystal layer. The electrode layer is then with covered an alignment layer 12 of polyimide (AL 3046 of JSR Co. of Japan) and rubbed so as to render it capable of aligning liquid crystal material. Its thickness is estimated to be about 100 to 200 nm.

The stratified-phase-separable material of Example 1 is then blade-coated on the alignment layer 12 to form a film of stratified-phase-separable material having a uniform thickness of about 25 µm.

In a nitrogen atmosphere, the film is then exposed to UV light in two separate exposure steps.

Referring to FIG. 5A, in the first exposure step, the film 3 is exposed pattern-wise via a mask 13 with UV light for 3 minutes at a high intensity (lamp type: Philips UHIP, intensity 100 mW/cm$^2$). At positions corresponding to the mask openings walls 10 (supporting members) of polymeric material are formed in accordance with the desired mask pattern. The walls are about 50 µm wide about 450 µm (edge-to-edge distance) apart. The polymeric supporting members serve, inter alia, to stabilize and strengthen the stratified phase-separated composite and support the cover layer 6 to be formed. In the masked regions, areas 303 of stratified-phase-separable material are formed. Since the formation of the supporting members 10 has consumed some of the monomeric material A1 and A3, the stratified-phase-separable material of the areas 303 is slightly enriched in liquid crystal material E7 compare to the original material. Referring to FIG. 5B, in the second exposure step which is similar to the exposure step of Example 1, the areas 303 are flood-exposed with UV-light 601 of a much lower intensity (lamp type: Philips TL-08, 0.5 mW/cm$^2$) for 15 minutes at a temperature of 50° C., thus performing the stratification step to form the liquid crystal layer 4 and the cover layer 6, which together with the supporting members 10 form the stratified-phase-separated composite. The total thickness of the stratified-phase-separated composite is about 25 µm, the liquid crystal layer 4 about 10 µm and the polymeric layer 6 about 15 µm.

In this particular example, the supporting members 10 form a connected rectangular grid partitioning the liquid crystal layer 4 into mutually separated compartments. This partitioning is by no means essential. The liquid crystal layer 4 may be also interrupted by supporting members which are mutually separated.

A display laminate 300 thus manufactured is then taken apart at the substrate/liquid crystal layer interface and the polymeric cover layer liquid crystal material is recovered. The transition temperature of the recovered material is measured and is found to be the same as that of fresh liquid crystal material, which demonstrates that the liquid crystal layer of the stratified phase-separated composite essentially consists of liquid crystal material E7.

A scanning electron microscopic analysis of a cross-section of the composite shows that the polymeric layer is essentially flat. No protrusions of any significant size are observed. In particular, no protrusions which disturb the optical appearance of the composite to the unaided eye or produce any significant scattering are observed. More in particular, the stratified-phase-separated composite is free of any protrusions which extend through the entire width of the liquid crystal layer.

The display laminate 300 is then arranged between two conventional crossed linear absorbing polarizers such that the rubbing direction of alignment layer of the laminate is aligned with the polar axis of one the polarizers. When positioned in front of a back light, the display laminate 300 appears dark indicating that the LC molecules of the LC layer are aligned in the rubbing direction.

A voltage source is then connected to the electrodes 8a and 8b of a display laminate 300 thus manufactured and a voltage of 10 V is applied. By applying the voltage, the laminate 300 is rendered transmissive and appears bright indicating that the in plane-electrodes 8a and 8b have changed the alignment of the liquid crystal layer such that incident polarized light experiences a birefringence. If the voltage is removed (or set to 0 Volts), the laminate turns dark again. The electro-optical effect is repeatable. The contrast of the display laminate 300 is estimated roughly about 7.

EXAMPLE 3

By way of example, a display laminate 700 as shown in FIG. 7A, without the optional auxiliary electrodes 8c may be manufactured as follows:

A glass substrate 2 (1.1 mm) carrying a patterned ITO bottom electrode layer (200 nm) 8a is provided with a rubbed poly-imide alignment layer 12 (100 to 200 nm) for enabling the liquid crystal layer 4 to adopt a planar orientation. On the substrate 2 a 25 µm film of the stratified-phase-separable material of Example 1 is formed, which film is doubly exposed in the manner described in Example 2 thus obtaining a stratified-phase-separated composite 7 of a 10 µm liquid crystal layer 4 and a 15 µm cover layer 6 supported by supporting members 10. The specific polymeric material used in this example renders the top surface of the cover layer 6 relatively apolar, poorly wettable for water. Also, the top surface of the cover layer 6 is somewhat uneven. In order to be able to apply a water-based film-forming material on the cover layer 6 and planarize the top surface and improve the mechanical stability, an intermediate layer 14, which provides a top surface of increased polarity, is provided as follows:

The top surface of the cover layer 6 is subject to a UV-ozone treatment for 10 min. The top surface is then coated with an about 5 to 10 µm film of a film-forming material consisting of 99 wt % tripropyleneglycol diacrylate and 1 wt % photoinitiator Irgacure 651. The film is cured by UV-exposure at 365 nm with a Philips PL-10 lamp during 10 minutes thus forming intermediate layer 14. The top surface of the intermediate layer 14, which is more polar than the top surface of cover layer 6, is then subjected to a UV-ozone treatment for 10 min and then a PEDOT solution (supplier Bayer) is spin-coated thereon. After drying the coating at 40° for 10 min a 200 nm thick top electrode layer 8b is formed resulting in the display laminate 700 (without electrodes 8c).

The display laminate 700 so manufactured is placed between crossed conventional linear polars such that the rubbing direction of the alignment layer makes an angle of 45° with the polar axis of the polarizers. Due to the birefringence of the planar aligned liquid crystal layer 4, the combination of polarizers and display laminate appears transparent.

If a voltage of about 100 V is applied, the display turns dark, demonstrating that the liquid crystal layer 4 is switched to a homeotropically oriented state in which the LC molecules are oriented along the electric field lines.

EXAMPLE 4

A display laminate in accordance with the invention comprising a coated polarizer is obtained as follows:

A display laminate is manufactured in accordance with Example 2. The laminate so manufactured is then provided with an intermediate layer of the type and in the

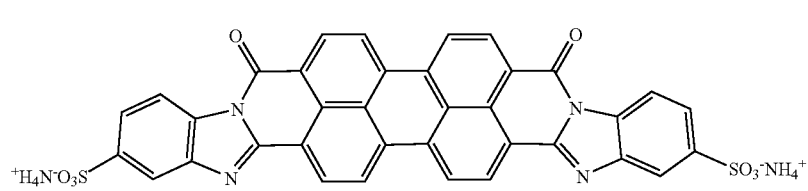

A4 manner of Example 3 to planarize the top surface of the cover layer of the laminate and to provide substrate surface which is wetted well by water. A lyotropic liquid crystal polarizer film-forming material is formed by dissolving 10 wt % of the perylene of formula A4 (available from Optiva Co., USA) in water.

A 10 μm film of the polarizer film-forming material is then formed on the top surface of the intermediate layer using a doctor blade. The doctor blade is moved in the same direction as the poly-imide alignment layer is rubbed. The shear forces exerted by the blade on the film make the perylene molecules of formula A4 stack in columns and align with their long axes orient in the direction of blading.

The film being thus oriented in the stacked and aligned columnar state is converted into the crystalline state by evaporating the water thus forming a polarizer layer of about 1 μm thick. The polarizer layer has a contrast of about 1:40.

EXAMPLE 5

A coated retarder layer which can be suitably used in combination with a display laminate in accordance with the invention is manufactured as follows:

A film-forming retarder material is provided by dissolving 1 g of the diacrylate A7 and a photo-initiator blend of 0.006 g of photo-initiator A6 (Irgacure 356, Ciba Geigy) and 0.014 g of photo-initiator A2 (Irgacure 651, Ciba Geigy) in 10 g of toluene.

The film-forming material is spin-coated on a substrate carrying a 30 nm rubbed poly-imide orientation layer. After evaporation of the toluene, a retarder layer film is obtained which, after being heated at a temperature of 70° C. for a few minutes, is uniaxially oriented in the direction of rubbing. The retarder layer is then cured by exposure to a 0.5 mW/cm$^2$ fluorescent UV lamp. The retardation (the product of thickness and birefringence) of the cured retardation layer is 98 nm.

EXAMPLE 6

A coated polarizer layer for use in combination with a laminate in accordance with the invention may be manufactured as follows:

A film-forming polarizer material is provided by dissolving 3 g of the liquid crystalline diacrylate A7 (prepared according to a method published in D. J. Broer et al in Makromol. Chem. 190, p 2255 (1989)), 6 g of the liquid crystalline diacrylate A8 (ibid), 1 g of the dichroic diazo dye A9 (Mitsui Toatsu dyes) and 0.1 g of the photo-initiator A10 known per se from D. J. Broer et al, Adv. Mat. 1999, 11 no. 7, p573 (supplier Merck), are dissolved in 40 g of toluene.

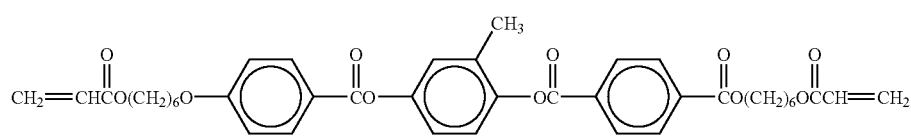

A5

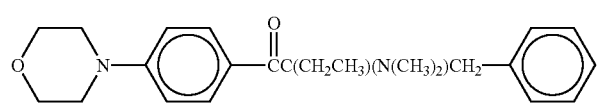

A6

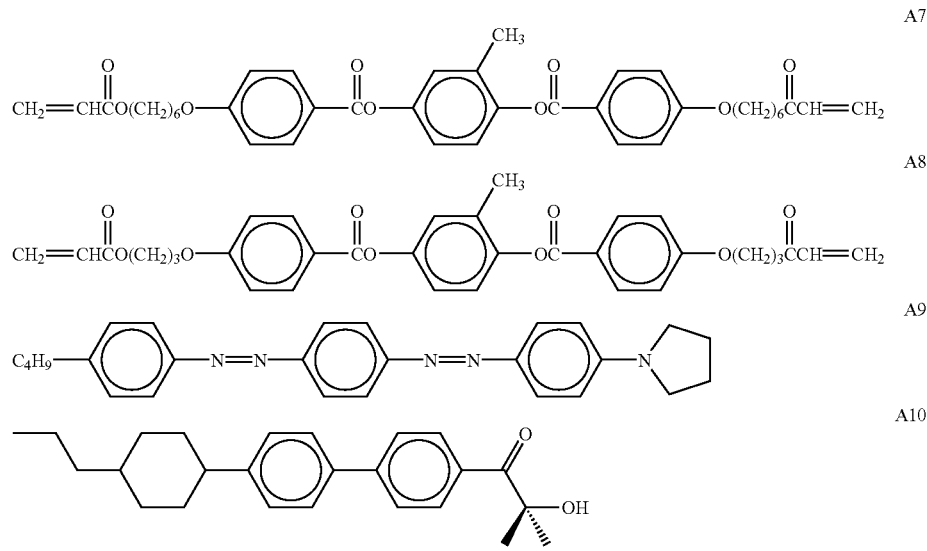

A7

A8

A9

A10

The film-forming polarizer material thus obtained is doctor-bladed on a substrate carrying a rubbed poly-imide orientation layer resulting in a wet film of 10 μm. After evaporation of the solvent is evaporated, and optional heating at 60° C. for a few minutes to improve the orientation of the polarizer material, a polarizer layer of uniaxially oriented polarizer material having a film thickness of 2 μm results. The polarizer layer is then cross-linked by exposure to UV light. Due to the dichroic azo dye which is, with its long axis, aligned with the uniaxial orientation, the polarizer layer absorbs polarization-selectively a broad wavelength range of the visible spectrum.

EXAMPLE 7

A reflector layer 2 comprising a 34-layer inorganic dielectric stack which may be used in combination with a laminate in accordance with the invention is manufactured by alternately evaporating $Nb_2O_5$ and $SiO_2$ layers on a glass substrate, each layer having an optical thickness as shown in Table 1.

| Layer number | Material | Optical thickness (μm) |
|---|---|---|
| 1 | $Nb_2O_5$ | 0.25 |
| 2 | $SiO_2$ | 0.21 |
| 3 | $Nb_2O_5$ | 0.2 |
| 4 | $SiO_2$ | 0.2 |
| 5 | $Nb_2O_5$ | 0.2 |
| 6 | $SiO_2$ | 0.19 |
| 7 | $Nb_2O_5$ | 0.19 |
| 8 | $SiO_2$ | 0.19 |
| 9 | $Nb_2O_5$ | 0.18 |
| 10 | $SiO_2$ | 0.18 |
| 11 | $Nb_2O_5$ | 0.18 |
| 12 | $SiO_2$ | 0.18 |
| 13 | $Nb_2O_5$ | 0.18 |
| 14 | $SiO_2$ | 0.19 |
| 15 | $Nb_2O_5$ | 0.19 |
| 16 | $SiO_2$ | 0.19 |
| 17 | $Nb_2O_5$ | 0.2 |

-continued

| Layer number | Material | Optical thickness (μm) |
|---|---|---|
| 18 | $SiO_2$ | 0.2 |
| 19 | $Nb_2O_5$ | 0.2 |
| 20 | $SiO_2$ | 0.21 |
| 21 | $Nb_2O_5$ | 0.25 |
| 22 | $SiO_2$ | 0.25 |
| 23 | $Nb_2O_5$ | 0.25 |
| 24 | $SiO_2$ | 0.25 |
| 25 | $Nb_2O_5$ | 0.25 |
| 26 | $SiO_2$ | 0.25 |
| 27 | $Nb_2O_5$ | 0.25 |
| 28 | $SiO_2$ | 0.25 |
| 29 | $Nb_2O_5$ | 0.25 |
| 30 | $SiO_2$ | 0.25 |
| 31 | $Nb_2O_5$ | 0.25 |
| 32 | $SiO_2$ | 0.25 |
| 33 | $Nb_2O_5$ | 0.25 |
| 34 | $SiO_2$ | 0.25 |

The optical characteristics of a stack so manufactured are measured and shown in FIG. 11

FIG. 11 shows a graph of relative transmission (curve T), reflection (curve R) and absorption (curve A), in %, as a function of wavelength λ, in nm, of a reflector layer for use in combination with a laminate in accordance with the invention.

FIG. 11 shows that the reflection mainly occurs within the a 400 to 700 nm wavelength range. Below 400 nm the reflector layer is largely transparent which renders the reflector layer particular useful in combination with a laminate comprising a stratified-phase-separated composite which is obtained from a UV-curable, photo-polymerizable stratified-phase-separable material.

EXAMPLE 8

A photo-polymerizable film-forming cholesteric reflector material is provided by mixing 65 g of the nematic diacrylate A7, 35 g of the chiral mono-acrylate A11, 1 g of the UV-absorbing dye A12 for establishing a UV light intensity gradient in the normal to a substrate, 2 g of the photo-initiator Irgacure 651 and 0.01 g of the inhibitor p-methoxyphenol.

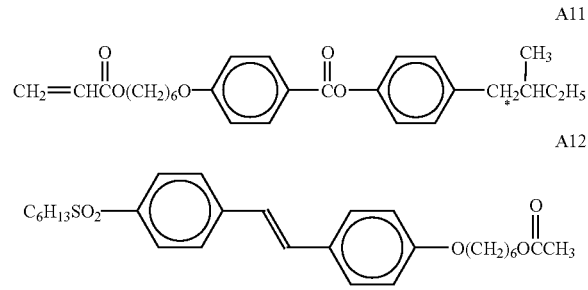

For the availability of these materials see U.S. Pat. No. 5,506,704. In accordance with a method disclosed in U.S. Pat. No. 5,506,704, a glass or plastic substrate is provided by doctor blading with a 15 µm cholesterically oriented film of the film-forming photo-polymerizable reflector layer material so prepared. The film so obtained is cured with UV light with an intensity of 0.2 mW.cm$^{-2}$ resulting in a cholesteric reflector layer. As a result of the photo-polymerization, the narrow reflection band of the cholesterically oriented film comprising the non-cured monomers is transformed into a broad reflection band in the cured state.

FIG. 12 shows a graph of transmission for left-handed (curve L) and right-handed (R) circularly polarized light as a function of wavelength λ, in nm, of a cholesteric reflector layer for use in combination with a laminate in accordance with the invention.

FIG. 12 shows that the reflection band of the cholesteric reflector spans the entire visible wavelength range. The reflector layer is however transparent in the UV region, rendering the reflector layer particular useful in combination with a laminate comprising a stratified-phase-separated composite which is obtained from a UV-curable, photo-polymerizable stratified-phase-separable material.

The cholesteric reflector layer is also polarization-selective. As shown in FIG. 12 only left-handed polarized is transmitted in the visible range.

The invention claimed is:

1. A liquid crystal display laminate comprising
a liquid crystal layer;
a single substrate for confining the liquid crystal layer; and
a cover layer formed adjacent to the liquid crystal layer for covering the liquid crystal layer at a side opposite the substrate side of the liquid crystal layer, the liquid crystal layer and the cover layer together forming a stratified-phase-separated composite;
wherein the cover layer includes, laid out in a pattern, connecting members that extend from the cover layer to the substrate, and, on a surface facing away from the connecting members, a relief pattern of recessed areas and elevated areas commensurate with the pattern of the connecting members.

2. The liquid crystal display laminate of claim 1, further including an electrode layer that includes spaced electrodes, and wherein the liquid crystal layer or a part thereof is disposed between the spaced electrodes for setting up an electrical field between the spaced electrodes which is capable of switching the liquid crystal layer or the said part thereof.

3. The liquid crystal display laminate of claim 1, wherein the liquid crystal layer or a part thereof is sandwiched between a bottom electrode disposed on the substrate side of the liquid crystal layer in the electrode layer and a top electrode disposed on the side of the liquid crystal layer remote from the single substrate for subjecting the liquid crystal layer or the said part thereof to an electric field, the top electrode comprising a wet-deposited electrically conductive material.

4. A display device comprising a display laminate as claimed in claim 1.

5. The liquid crystal display laminate of claim 1, wherein the elevated areas are located opposite the connecting members.

6. The liquid crystal display laminate of claim 5, including a conductor layer having a conductor pattern corresponding to the elevated areas.

7. The liquid crystal display laminate of claim 1, wherein the recessed areas are located opposite the connecting members.

8. The liquid crystal display laminate of claim 1, including a conductor layer having a conductor pattern corresponding to the elevated areas.

9. A method of manufacturing a liquid crystal display laminate comprising a liquid crystal layer, a substrate for confining the liquid crystal layer at a side thereof and a cover layer for covering the liquid crystal layer at a side opposite the side at which the substrate confines the liquid crystal layer, the method comprising:
providing a substrate for confining a liquid crystal layer at a side thereof;
providing a liquid crystal coating material from which the liquid crystal layer is obtainable, wherein the liquid crystal coating material is a stratified-phase-separable coating material;
depositing the liquid crystal coating material on the substrate by means of a wet deposition method;
obtaining, adjacent the substrate, the liquid crystal layer from the liquid crystal coating material, the substrate thus confining the liquid crystal layer at a side thereof; and
providing a cover layer for covering the liquid crystal layer at a side opposite the side at which the substrate confines the liquid crystal layer, wherein the steps of obtaining the liquid crystal layer and providing the cover layer are executed simultaneously by carrying out stratification of the stratified-phase-separable coating material to form the liquid crystal layer and the cover layer covering the liquid crystal layer; wherein
providing the cover layer includes forming, in a pattern, connecting members that extend from the cover layer to the substrate, and, on a side facing away from the connecting members, a relief pattern of recessed areas and elevated areas commensurate with the Pattern of the connecting members.

10. The method of claim 9, including applying one or more electrodes on the cover layer by a wet deposition method.

11. The method of claim 9, including applying conductive material to the elevated areas.

12. The method of claim 9, including pressing the cover layer to a layer of conductive paste, to form a conductor pattern corresponding to the elevated areas.

13. The method of claim 12, including curing the conductive paste at an elevated temperature.

14. The method of claim 12, wherein the conductive paste includes silver.

* * * * *